US012243237B2

(12) United States Patent
Okamoto

(10) Patent No.: US 12,243,237 B2
(45) Date of Patent: Mar. 4, 2025

(54) PATTERN-EDGE DETECTION METHOD, PATTERN-EDGE DETECTION APPARATUS, AND STORAGE MEDIUM STORING PROGRAM FOR CAUSING A COMPUTER TO PERFORM PATTERN-EDGE DETECTION

(71) Applicant: TASMIT, INC., Yokohama (JP)

(72) Inventor: Yosuke Okamoto, Yokohama (JP)

(73) Assignee: TASMIT, INC., Yokohama (JP)

( * ) Notice: Subject to any disclaimer, the term of this patent is extended or adjusted under 35 U.S.C. 154(b) by 441 days.

(21) Appl. No.: 17/791,155

(22) PCT Filed: Dec. 10, 2020

(86) PCT No.: PCT/JP2020/046010
§ 371 (c)(1),
(2) Date: Jul. 6, 2022

(87) PCT Pub. No.: WO2021/140823
PCT Pub. Date: Jul. 15, 2021

(65) Prior Publication Data
US 2023/0005157 A1    Jan. 5, 2023

(30) Foreign Application Priority Data

Jan. 10, 2020 (JP) ................................. 2020-002735
Dec. 4, 2020 (JP) ................................. 2020-201982

(51) Int. Cl.
*G06T 7/13* (2017.01)
(52) U.S. Cl.
CPC ...... *G06T 7/13* (2017.01); *G06T 2207/10061* (2013.01); *G06T 2207/20081* (2013.01); *G06T 2207/30164* (2013.01)
(58) Field of Classification Search
CPC ........ G06T 7/0004; G06T 2207/10056; G06V 18/23; G06F 18/25; G06F 18/21
See application file for complete search history.

(56) References Cited

U.S. PATENT DOCUMENTS 7,668,388 B2 * 2/2010 Bryll .................... G06T 7/0004
382/255
7,912,288 B2 * 3/2011 Winn ................... G06V 10/267
382/173

(Continued)

FOREIGN PATENT DOCUMENTS

JP    05-324836 A    12/1993
JP    2002373333    12/2002

(Continued)

OTHER PUBLICATIONS

International Patent Application No. PCT/JP2020/046010; International Search Report and Written Opinion dated Mar. 2, 2021, 9 pgs.

(Continued)

*Primary Examiner* — Yosef Kassa
(74) *Attorney, Agent, or Firm* — Cozen O'Connor

(57) ABSTRACT

The present invention relates to a method of detecting an edge (or a contour line) of a pattern, which is formed on a workpiece (e.g., a wafer or a mask) for use in manufacturing of semiconductor, from an image generated by a scanning electron microscope. The pattern-edge detection method includes: generating an objective image of a target pattern formed on a workpiece; generating a feature vector representing features of each pixel constituting the objective image; inputting the feature vector to a model constructed by machine learning; outputting, from the model, a determination result indicating whether the pixel having the feature vector is an edge pixel or a non-edge pixel; and connecting a plurality of pixels, each having a feature vector that has obtained a determination result indicating an edge pixel, with a line to generate a virtual edge.

30 Claims, 19 Drawing Sheets

(56) References Cited

U.S. PATENT DOCUMENTS

| | | | |
|---|---|---|---|
| 7,949,568 B2* | 5/2011 | Fano | G06Q 10/087 |
| | | | 705/28 |
| 8,676,733 B2* | 3/2014 | Heisele | G06F 18/231 |
| | | | 706/13 |
| 8,837,839 B1* | 9/2014 | Huber | G06V 10/762 |
| | | | 382/284 |
| 10,011,226 B2* | 7/2018 | Stein | H04N 7/181 |
| 10,229,342 B2 | 3/2019 | Song et al. | |

FOREIGN PATENT DOCUMENTS

| | | | |
|---|---|---|---|
| JP | 2003178314 A | 6/2003 | |
| JP | 2013098267 A | 5/2013 | |
| JP | 2017-519277 A | 7/2017 | |
| JP | 2019-008599 A | 1/2019 | |
| JP | 2019-129169 A | 8/2019 | |
| JP | 2019-174940 A | 10/2019 | |
| JP | 2020140518 | 9/2020 | |

OTHER PUBLICATIONS

Okamoto et al. (2021), "Contour extraction algorithm for edge placement error measurement using machine learning", https://www.spfedigltaliibrary.org/conference-proceectfngs-of-spie on Feb. 8, 2021.

Wei et al. (2021), "Realizing more accurate OPC models by utilizing SEM contours," https://www.spfedigltaliibrary.org/conference-proceectfngs-of-spie on Feb. 9, 2021.

* cited by examiner

PATTERN-EDGE DETECTION METHOD, PATTERN-EDGE DETECTION APPARATUS, AND STORAGE MEDIUM STORING PROGRAM FOR CAUSING A COMPUTER TO PERFORM PATTERN-EDGE DETECTION

CROSS-REFERENCE TO RELATED APPLICATIONS

This application is a 35 U.S.C. § 371 filing of International Application No. PCT/JP2020/046010 filed Dec. 10, 2020, which claims the benefit of priority to Japanese Patent Application No 2020-002735 filed Jan. 10, 2020 and Japanese Patent Application No 2020-201982 filed Dec. 4, 2020, each of which is incorporated herein by reference in its entirety.

TECHNICAL FIELD

The present invention relates to a method and an apparatus for detecting an edge (or a contour line) of a pattern, which is formed on a workpiece (e.g., a wafer or a mask) for use in manufacturing of semiconductor, from an image generated by a scanning electron microscope. The present invention further relates to a program for causing a computer to perform such pattern-edge detection.

The present invention further relates to a method and an apparatus for creating an edge detection model by machine learning.

BACKGROUND ART

Conventionally, an edge (or a contour line) of a pattern formed on a workpiece, such as a wafer, is detected as follows. First, an image of the pattern on the workpiece is generated by a scanning electron microscope. Next, a CAD pattern is generated from design data (also referred to as CAD data) for the pattern, and the CAD pattern is superimposed on the pattern on the image. The CAD pattern is a virtual pattern created based on the design information (position, length, size, etc.) of the pattern included in the design data.

FIG. 25 is a schematic diagram showing a CAD pattern 505 superimposed on a pattern 501 on an image 500. As shown in FIG. 25, a computer generates multiple search lines 507 each extending in a normal direction with respect to an edge of the CAD pattern 505, and creates brightness profiles of the image 500 along these search lines 507, respectively. In FIG. 25, only a part of the multiple search lines 507 is depicted in order to simplify the drawing.

FIG. 26 is a diagram showing the brightness profile along the search line shown in FIG. 25. Vertical axis of FIG. 26 represents brightness value, and horizontal axis represents position on the search line 507. The computer detects an edge point 510 where the brightness value on the brightness profile is equal to a threshold value. The computer repeats the same operation to determine multiple edge points on the brightness profiles along all search lines 507. A line connecting the multiple edge points is determined to be the edge of the pattern 501 on the image 500.

However, in examples shown in FIGS. 27 to 29, a pattern edge on the image 500 may not be correctly determined (detected). Specifically, in the example shown in FIG. 27, a part of the edge of the pattern 501 is missing, and the edge of the pattern 501 does not exist on a search line 507 perpendicular to the CAD pattern 505. In the example shown in FIG. 28, the edge of the CAD pattern 505 is far from the edge of the pattern 501 on the image, and as a result, the edge of the pattern 501 does not exist on a search line 507. In the example shown in FIG. 29, an edge of a pattern 510, which does not exist in the CAD pattern 505, cannot be detected by the conventional method using the search lines 507.

FIGS. 27 to 29 show examples of pattern defects, and it is important to detect the edges of such defective patterns. However, the real pattern may deviate from the design data, and the conventional method using the design data may not be able to correctly detect the edge of the defective pattern.

On the other hand, a technique for detecting an edge of a pattern formed on a workpiece, such as a wafer, using a model created by machine learning has been developed. In this technique, an edge detection model (trained model) determines whether or not each pixel of an image of a pattern constitutes a pattern edge.

The edge detection model is created by the machine learning (for example, deep learning, decision tree learning, etc.) using training data prepared in advance. The training data includes a pattern image generated by a scanning electron microscope and correct answer data of each pixel constituting the pattern image. The correct answer data is information that identifies each pixel as either a pixel that constitutes an edge of a pattern or a pixel that does not constitute an edge. The machine learning using such training data is performed so as to optimize parameters (weighting factors, etc.) constituting the edge detection model.

However, the pattern edge used for the training data has deviations. Moreover, a boundary line between the edge and a non-edge region on the image is unclear. The edge detection model created using such training data may fail to detect edges or may erroneously detect edges. Creating an accurate edge detection model requires a large amount of training data for the machine learning, and as a result, the machine learning takes a very long time.

CITATION LIST

Patent Literature

Patent document 1: Japanese laid-open patent publication No. 2003-178314
Patent document 2: Japanese laid-open patent publication No. 2013-98267
Patent document 3: Japanese laid-open patent publication No. 2020-140518

SUMMARY OF INVENTION

Technical Problem

The present invention provides a pattern-edge detection method and a pattern-edge detection apparatus capable of detecting an edge (or a contour line) of a pattern on an image without using pattern design data.

The present invention further provides a method and an apparatus capable of creating an accurate edge detection model without requiring a long time on machine learning.

Solution to Problem

In an embodiment, there is provided a pattern-edge detection method comprising: generating an objective image of a target pattern formed on a workpiece; generating a feature vector representing features of each pixel constituting the objective image; inputting the feature vector to a model constructed by machine learning; outputting, from the model, a determination result indicating whether the pixel having the feature vector is an edge pixel or a non-edge pixel; and connecting a plurality of pixels, each having a feature vector that has obtained a determination result indicating an edge pixel, with a line to generate a virtual edge.

In an embodiment, the model is a decision tree.

In an embodiment, the pattern-edge detection method further comprises: selecting training patterns from design data; generating training images of real patterns that have been produced based on the training patterns, respectively; detecting edges of the real patterns on the training images; classifying reference pixels constituting the training images into first reference pixels each constituting an edge and second reference pixels that do not constitute an edge; generating first feature vectors of the first reference pixels and second feature vectors of the second reference pixels; and constructing the model by the machine learning using training data including the first feature vectors and the second feature vectors.

In an embodiment, the training patterns include a plurality of patterns having at least an edge extending in a first direction, an edge extending in a second direction perpendicular to the first direction, a corner edge, and a terminal edge.

In an embodiment, the real patterns are patterns formed on the workpiece.

In an embodiment, selecting the training patterns from the design data comprises: displaying, on a display screen, a design diagram including a plurality of patterns drawn based on the design data; and displaying, on the display screen, the training patterns selected from the plurality of patterns included in the design diagram or an area where the training patterns are located in a visually emphasized manner.

In an embodiment, the pattern-edge detection method further comprises: generating multiple brightness profiles of the objective image along multiple search lines each extending in a normal direction with respect to the virtual edge; determining multiple edge points based on the multiple brightness profiles; and generating a renewed edge by connecting the multiple edge points with a line.

In an embodiment, the pattern-edge detection method further comprises: generating, from the design data, a CAD pattern corresponding to the target pattern; and measuring a distance from an edge of the CAD pattern to the renewed edge.

In an embodiment, there is provided a pattern-edge detection apparatus comprising: an image generating device configured to generate an objective image of a target pattern formed on a workpiece; and an arithmetic system coupled to the image generating device, the arithmetic system being configured to: generate a feature vector representing features of each pixel constituting the objective image; input the feature vector to a model constructed by machine learning; output, from the model, a determination result indicating whether the pixel having the feature vector is an edge pixel or a non-edge pixel; and connect a plurality of pixels, each having a feature vector that has obtained a determination result indicating an edge pixel, with a line to generate a virtual edge.

In an embodiment, the model is a decision tree.

In an embodiment, the arithmetic system is configured to: select training patterns from design data; generate training images of real patterns that have been produced based on the training patterns, respectively; detect edges of the real patterns on the training images; classify reference pixels constituting the training images into first reference pixels each constituting an edge and second reference pixels that do not constitute an edge; generate first feature vectors of the first reference pixels and second feature vectors of the second reference pixels; and construct the model by the machine learning using training data including the first feature vectors and the second feature vectors.

In an embodiment, the training patterns include a plurality of patterns having at least an edge extending in a first direction, an edge extending in a second direction perpendicular to the first direction, a corner edge, and a terminal edge.

In an embodiment, the real patterns are patterns formed on the workpiece.

In an embodiment, the arithmetic system includes a display screen, and the arithmetic system is configured to: display, on the display screen, a design diagram including a plurality of patterns drawn based on the design data; and display, on the display screen, the training patterns selected from the plurality of patterns included in the design diagram or an area where the training patterns are located in a visually emphasized manner.

In an embodiment, the arithmetic system is configured to: generate multiple brightness profiles of the objective image along multiple search lines each extending in a normal direction with respect to the virtual edge; determine multiple edge points based on the multiple brightness profiles; and generate a renewed edge by connecting the multiple edge points with a line.

In an embodiment, the arithmetic system is configured to: generate, from the design data, a CAD pattern corresponding to the target pattern; and measure a distance from an edge of the CAD pattern to the renewed edge.

In an embodiment, there is provided a computer-readable storage medium storing a program therein for causing a computer to: instruct a scanning electron microscope to generate an objective image of a target pattern formed on a workpiece; generate a feature vector representing features of each pixel constituting the objective image; input the feature vector to a model constructed by machine learning; output, from the model, a determination result indicating whether the pixel having the feature vector is an edge pixel or a non-edge pixel; and connect a plurality of pixels, each having a feature vector that has obtained a determination result indicating an edge pixel, with a line to generate a virtual edge.

In an embodiment, the model is a decision tree.

In an embodiment, the program is further configured to cause the computer to: select training patterns from design data; instruct the scanning electron microscope to generate training images of real patterns that have been produced based on the training patterns, respectively; detect edges of the real patterns on the training images; classify reference pixels constituting the training images into first reference pixels each constituting an edge and second reference pixels that do not constitute an edge; generate first feature vectors of the first reference pixels and second feature vectors of the second reference pixels; and construct the model by the machine learning using training data including the first feature vectors and the second feature vectors.

In an embodiment, the training patterns include a plurality of patterns having at least an edge extending in a first direction, an edge extending in a second direction perpendicular to the first direction, a corner edge, and a terminal edge.

In an embodiment, the real patterns are patterns formed on the workpiece.

In an embodiment, selecting the training patterns from the design data comprises: displaying, on a display screen, a design diagram including a plurality of patterns drawn based on the design data; and displaying, on the display screen, the training patterns selected from the plurality of patterns included in the design diagram or an area where the training patterns are located in a visually emphasized manner.

In an embodiment, the program is further configured to cause the computer to: generate multiple brightness profiles of the objective image along multiple search lines each extending in a normal direction with respect to the virtual edge; determine multiple edge points based on the multiple brightness profiles; and generate a renewed edge by connecting the multiple edge points with a line.

In an embodiment, the program is further configured to cause the computer to: generate, from the design data, a CAD pattern corresponding to the target pattern; and measure a distance from an edge of the CAD pattern to the renewed edge.

In an embodiment, there is provided a method of producing an edge detection model for detecting an edge of a pattern on an image, comprising: generating a training image of a workpiece having a pattern formed thereon with a scanning electron microscope; detecting an edge of the pattern on the training image; calculating feature vectors of pixels constituting the training image; dividing a target area in the training image into an edge region, a near-edge region, and a non-edge region; producing training data including feature vectors of first pixels in the edge region, feature vectors of second pixels in the near-edge region, and feature vectors of third pixels in the non-edge region; and producing the edge detection model by machine learning using the training data.

In an embodiment, where the number of first pixels is denoted by A, and a sum of the number of second pixels and the number of third pixels is denoted by B, a value (A/B) obtained by dividing the number A by the number B is a predetermined numerical value.

In an embodiment, the value (A/B) obtained by dividing the number A by the number B is in a range of 0.6 to 1.5.

In an embodiment, the non-edge region is located away from the edge region by a predetermined number of pixels, and the near-edge region is located between the edge region and the non-edge region.

In an embodiment, dividing the target region in the training image into the edge region, the near-edge region, and the non-edge region comprises dividing the target region in the training image into an edge region, an exclusion region, a near-edge region, and a non-edge region; the exclusion region is adjacent to the edge region and is located between the edge region and the near-edge region; and the training data does not include feature vectors of pixels in the exclusion region.

In an embodiment, the target region includes a first region including a first edge, a second region including a second edge perpendicular to the first edge, and a third region including a corner edge and a terminal edge.

In an embodiment, the number of pixels in the first region, the number of pixels in the second region, and the number of pixels in the third region are in a predetermined ratio.

In an embodiment, there is provided a model generating apparatus for producing an edge detection model for detecting an edge of a pattern on an image, comprising: a memory storing a program for producing the edge detection model; and an arithmetic device configured to perform arithmetic operations according to instructions included in the program, wherein the model generating apparatus is configured to: obtain, from a scanning electron microscope, a training image of a workpiece having a pattern formed thereon; detect an edge of the pattern on the training image; calculate feature vectors of pixels constituting the training image; divide a target area in the training image into an edge region, a near-edge region, and a non-edge region; produce training data including feature vectors of first pixels in the edge region, feature vectors of second pixels in the near-edge region, and feature vectors of third pixels in the non-edge region; and produce the edge detection model by machine learning using the training data.

In an embodiment, where the number of first pixels is denoted by A, and a sum of the number of second pixels and the number of third pixels is denoted by B, a value (A/B) obtained by dividing the number A by the number B is a predetermined numerical value.

In an embodiment, the value (A/B) obtained by dividing the number A by the number B is in a range of 0.6 to 1.5.

In an embodiment, the non-edge region is located away from the edge region by a predetermined number of pixels, and the near-edge region is located between the edge region and the non-edge region.

In an embodiment, the model generating apparatus is configured to divide the target region in the training image into an edge region, an exclusion region, a near-edge region, and a non-edge region; the exclusion region is adjacent to the edge region and is located between the edge region and the near-edge region; and the training data does not include feature vectors of pixels in the exclusion region.

In an embodiment, the target region includes a first region including a first edge, a second region including a second edge perpendicular to the first edge, and a third region including a corner edge and a terminal edge.

In an embodiment, the number of pixels in the first region, the number of pixels in the second region, and the number of pixels in the third region are in a predetermined ratio.

In an embodiment, there is provided a computer-readable storage medium storing a program therein for causing a computer to: obtain, from a scanning electron microscope, a training image of a workpiece having a pattern formed thereon; detect an edge of the pattern on the training image; calculate feature vectors of pixels constituting the training image; divide a target area in the training image into an edge region, a near-edge region, and a non-edge region; produce training data including feature vectors of first pixels in the edge region, feature vectors of second pixels in the near-edge region, and feature vectors of third pixels in the non-edge region; and produce an edge detection model by machine learning using the training data.

Advantageous Effects of Invention

According to the present invention, the edge is detected using the model created by the machine learning, instead of pattern design data. Specifically, the virtual edge is generated based on the determination result output from the model. This virtual edge is expected to have a shape very close to the edge of the pattern appearing on the image.

According to the present invention, the training data including pixels in the edge region, pixels in the near-edge region, and pixels in the non-edge region is used for the machine learning. In particular, the training data includes the pixels in the near-edge region which are considered difficult to be determined. Therefore, the edge detection model created by the machine learning can accurately determine whether or not a given pixel constitutes an edge.

Further, according to the present invention, the pixels in the exclusion region are not used for the machine learning. The pixels in this exclusion region may be edge pixels or non-edge pixels. In other words, the pixels in the exclusion region are uncertain pixels. By excluding feature vectors of such uncertain pixels from the training data, the machine learning of the edge detection model can be completed in a shorter time.

DESCRIPTION OF EMBODIMENTS

Hereinafter, embodiments of the present invention will be described with reference to the drawings.

Figure 1:
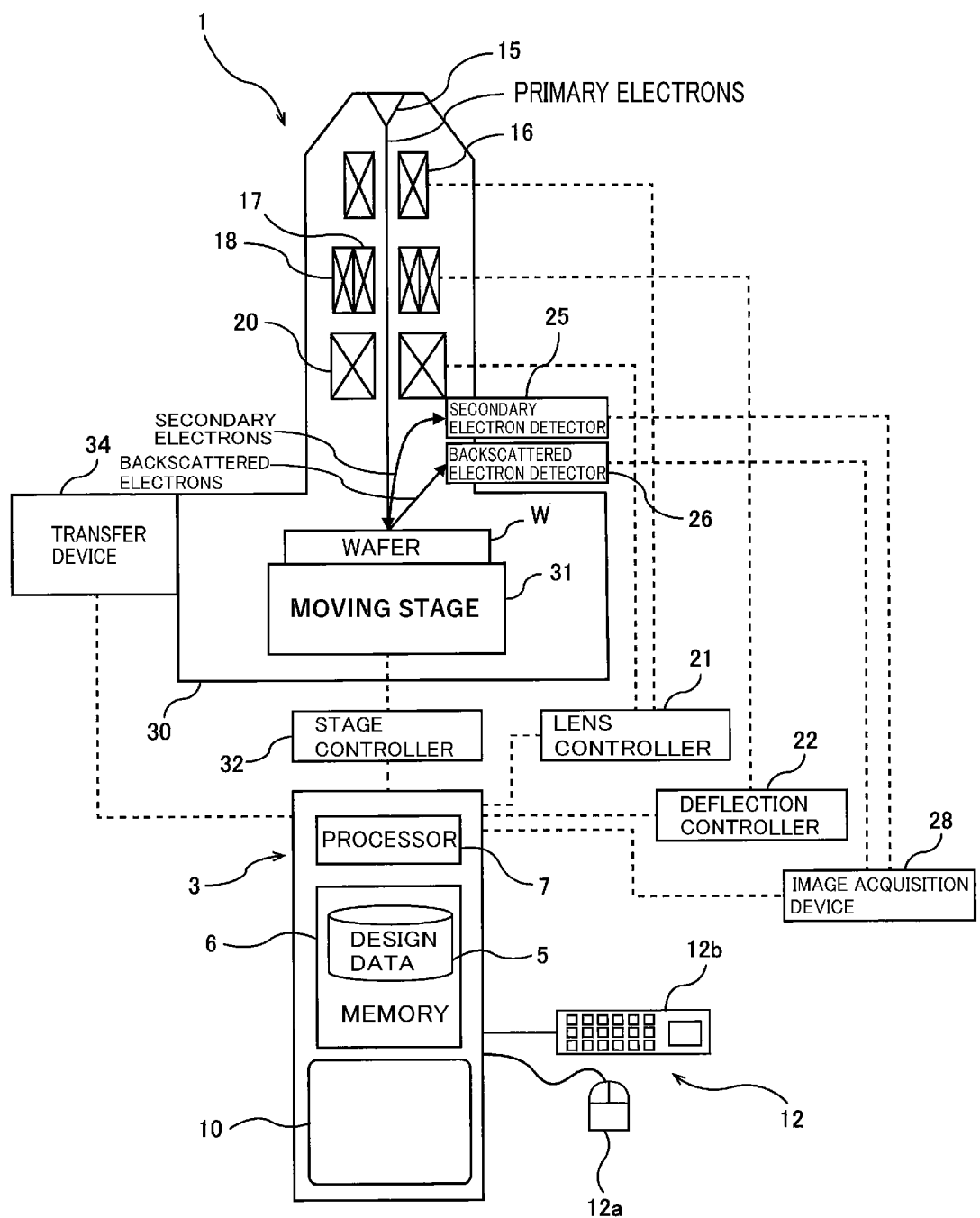
FIG. 1 is a schematic diagram showing an embodiment of a pattern-edge detection apparatus.

FIG. 1 is a schematic diagram showing an embodiment of a pattern-edge detection apparatus. As shown in FIG. 1, the pattern-edge detection apparatus includes a scanning electron microscope 1 and an arithmetic system 3. The scanning electron microscope 1 is an example of an image generating device that generates an image of a workpiece. Examples of workpiece include wafer and mask involved in manufacturing of a semiconductor. In the embodiments described below, a wafer is adopted as an example of the workpiece, but the present invention is not limited to the following embodiments. A pattern is an interconnect pattern of an electronic device formed on the workpiece.

The scanning electron microscope 1 is coupled to the arithmetic system 3, and operations of the scanning electron microscope 1 are controlled by the arithmetic system 3. The calculation system 3 includes a memory 6 in which a database 5 and programs are stored, a processor 7 configured to perform arithmetic operations according to instructions included in the programs, and a display screen 10 configured to display an image and a GUI (graphical user interface). The memory 6 includes a main memory, such as RAM, and an auxiliary memory, such as a hard disk drive (HDD) or a solid state drive (SSD). Examples of the processor 7 include a CPU (central processing unit) and a GPU (graphic processing unit). However, the specific configuration of the arithmetic system 3 is not limited to these examples.

The arithmetic system 3 further includes an input device 12 including a mouse 12a and a keyboard 12b. A user can manipulate the GUI appearing on the display screen 10 by using the mouse 12a and/or the keyboard 12b. The input device 12 including the mouse 12a and the keyboard 12b is an example, and the present invention is not limited to the input device 12 of the present embodiment.

The arithmetic system 3 includes at least one computer. For example, the arithmetic system 3 may be an edge server coupled to the scanning electron microscope 1 by a communication line, or may be a cloud server coupled to the scanning electron microscope 1 by a communication network, such as the Internet or a local area network. The arithmetic system 3 may be a combination of a plurality of servers. For example, the arithmetic system 3 may be a combination of an edge server and a cloud server coupled to each other by a communication network, such as the Internet or a local area network, or a combination of a plurality of servers which are not connected by a communication network.

The scanning electron microscope 1 includes an electron gun 15 configured to emit an electron beam composed of primary electrons (charged particles), a converging lens 16 configured to converge the electron beam emitted by the electron gun 15, an X deflector 17 configured to deflect the electron beam in an X direction, a Y deflector 18 configured to deflect the electron beam in a Y direction, and an objective lens 20 configured to focus the electron beam on a wafer W which is an example of a workpiece.

The converging lens 16 and the objective lens 20 are coupled to a lens controller 21, so that operations of the converging lens 16 and the objective lens 20 are controlled by the lens controller 21. The lens controller 21 is coupled to the arithmetic system 3. The X deflector 17 and the Y deflector 18 are coupled to a deflection controller 22, so that deflecting operations of the X deflector 17 and the Y deflector 18 are controlled by the deflection controller 22. The deflection controller 22 is also coupled to the arithmetic system 3 as well. A secondary-electron detector 25 and a backscattered-electron detector 26 are coupled to an image acquisition device 28. The image acquisition device 28 is configured to convert output signals of the secondary-electron detector 25 and the backscattered-electron detector 26 into image(s). The image acquisition device 28 is also coupled to the arithmetic system 3 as well.

A stage 31, which is arranged in a chamber 30, is coupled to a stage controller 32, so that a position of the stage 31 is controlled by the stage controller 32. The stage controller 32 is coupled to the arithmetic system 3. A transporting device 34 for placing the wafer W onto the stage 31 in the chamber 30 is also coupled to the arithmetic system 3.

The electron beam emitted by the electron gun 15 is converged by the converging lens 16 and then focused by the objective lens 20 on the surface of the wafer W, while the electron beam is deflected by the X deflector 17 and the Y deflector 18. When the wafer W is irradiated with the primary electrons of the electron beam, the secondary electrons and the backscattered electrons are emitted from the wafer W. The secondary electrons are detected by the secondary-electron detector 25, and the backscattered electrons are detected by the backscattered-electron detector 26. Signals of the detected secondary electrons and signals of the detected backscattered electron are input to the image acquisition device 28 and converted into image(s). The image is transmitted to the arithmetic system 3.

A design data for a pattern formed on the wafer W is stored in advance in the memory 6. The pattern on the wafer W is produced based on the design data. The design data for the pattern includes pattern design information, such as coordinates of vertices of the pattern, position, shape, and size of the pattern, and the number of the layer to which the pattern belongs. The database 5 is constructed in the memory 6. The pattern design data is stored in the database 5 in advance. The arithmetic system 3 can read out the design data from the database 5 stored in the memory 6. The design data is also called CAD data. CAD is an abbreviation for computer-aided design.

Figure 2:
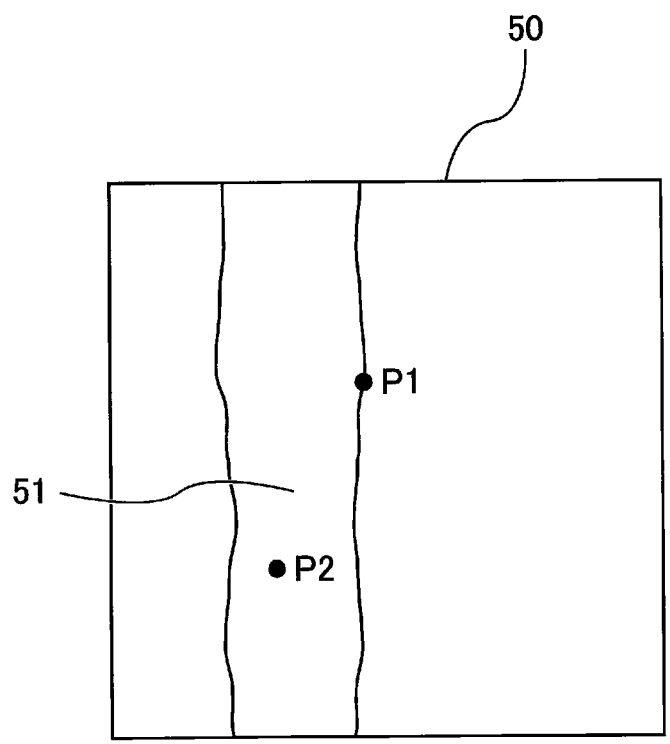
FIG. 2 is a schematic diagram showing an objective image.

Next, a method of detecting an edge (or a contour line) of the pattern on the image will be described. First, the scanning electron microscope 1 generates a plurality of images of a plurality of patterns formed on the wafer W. The arithmetic system 3 acquires an objective image, which is one of the plurality of images, from the scanning electron microscope 1. FIG. 2 is a schematic diagram showing the objective image. A target pattern 51 having an edge to be detected appears on the objective image 50. This target pattern 51 is a pattern formed on the wafer W.

The arithmetic system 3 generates a feature vector representing a plurality of features of each pixel of the objective image 50. The feature vector is a multidimensional vector including a plurality of features of each pixel. The features are numerical values representing a characteristic of each pixel. In the present embodiment, the plurality of features of each pixel are differences between a brightness value of that pixel and brightness values of other pixels. The brightness value is, in one example, a discrete numerical value ranging from 0 to 255 according to a gray scale. In this embodiment, the other pixels are adjacent pixels. In one embodiment, the other pixels may be non-adjacent pixels.

The arithmetic system 3 is configured to apply a differential filter to the objective image 50 to generate the feature vector including the plurality of features. Specifically, the arithmetic system 3 calculates differences between a brightness value of a pixel and brightness values of pixels existing around that pixel. These calculated differences constitute the plurality of features included in one feature vector.

For example, when a brightness value of a pixel P1 shown in FIG. 2 is 100 and brightness values of a plurality of pixels existing around the pixel P1 are 200, 150, 100, 50, the calculated differences are −100, −50, 0, 50. Therefore, the feature vector of the pixel P1 in this example is expressed as (−100, −50, 0, 50). In another example, when a brightness value of a pixel P2 shown in FIG. 2 is 10, and brightness values of a plurality of pixels existing around the pixel P2 are 20, 15, 10, and 10, the calculated differences are −10, −5, 0, 0. Therefore, the feature vector of the pixel P2 in this example is expressed as (−10, −5, 0, 0).

In the present embodiment, the number of features included in the feature vector is four, but the present invention is not limited to this embodiment. The feature vector may contain feature(s) less than four or greater than four.

The arithmetic system 3 inputs the plurality of features constituting the feature vector into a model constructed according to the machine learning, and outputs from the model a determination result indicating an edge pixel or a non-edge pixel. This model is a trained model or tuned model that has been produced according to the machine learning using training data. The training data includes feature vectors of a plurality of pixels and correct answer data of these feature vectors. The correct answer data includes information that identifies a pixel having a certain feature vector as either a pixel that constitutes an edge of a pattern or a pixel that does not constitute an edge. Each of the feature vectors of the plurality of pixels included in the training data is associated with (or connected to) the correct answer data.

The model created by the machine learning using such training data can determine whether an unknown pixel is an edge pixel or a non-edge pixel from a feature vector of the unknown pixel. Specifically, the feature vector of the unknown pixel is input to the model, and the model outputs the determination result indicating an edge pixel or a non-edge pixel.

Figure 3:
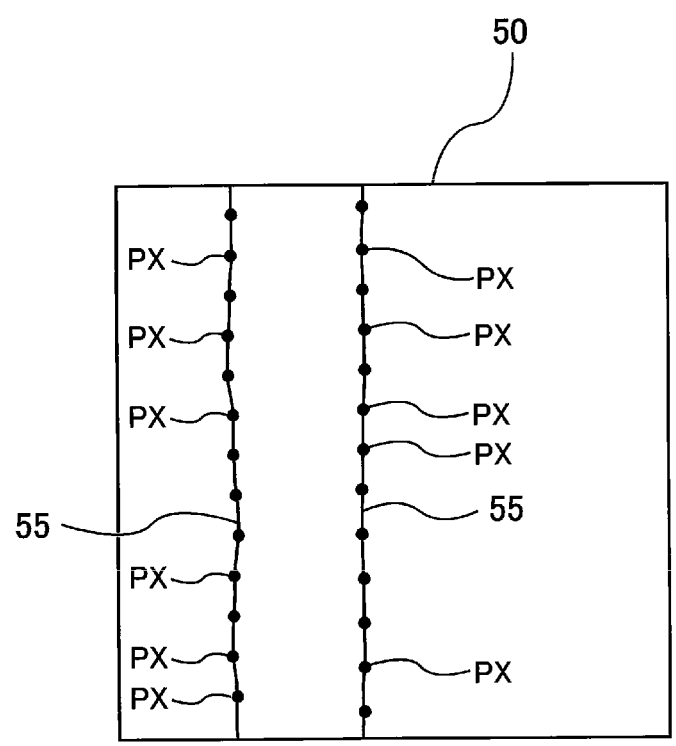
FIG. 3 is a schematic diagram showing a virtual edge.

The arithmetic system 3 selects a plurality of pixels each having a feature vector that has obtained a determination result indicating an edge pixel, and connects the plurality of selected pixels with a line to generate a virtual edge. FIG. 3 is a schematic diagram showing the virtual edge. The arithmetic system 3 forms a virtual edge 55 by connecting a plurality of pixels PX, each having a feature vector that has obtained a determination result indicating an edge pixel, with a line. The virtual edge 55 is expected to have a shape close to the edge of the target pattern 51 (see FIG. 2) on the wafer W.

In this embodiment, a decision tree is used as the model. The decision tree is a model (trained model or tuned model) constructed according to a random forest algorithm, which is an example of machine learning algorithm.

Figure 4:
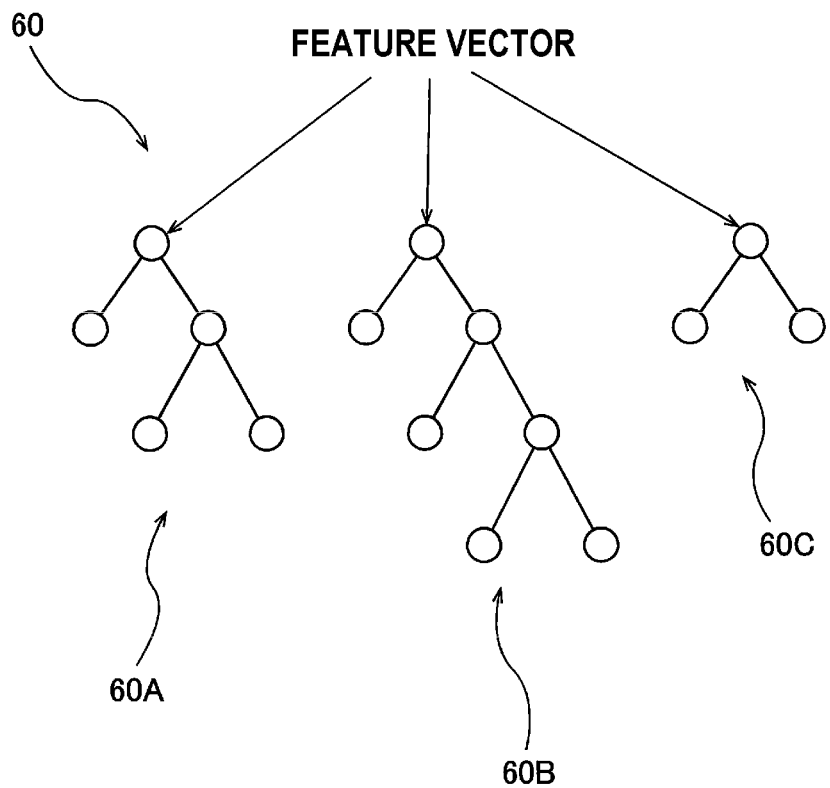
FIG. 4 is a schematic diagram showing an embodiment of a model constituted of a decision tree.

FIG. 4 is a schematic diagram showing an embodiment of the model constituted of the decision tree. As shown in FIG. 4, a model 60 includes a plurality of decision trees 60A, 60B, 60C. The feature vector of each pixel is input to each of these decision trees 60A, 60B, 60C. The plurality of decision trees 60A, 60B, and 60C determine whether the pixel having the feature vector is an edge pixel or a non-edge pixel according to the algorithm of each decision tree. In the example shown in FIG. 4, the model 60 includes three decision trees 60A, 60B, and 60C, but the number of decision trees is not particularly limited. In one embodiment, the model 60 may include only one decision tree.

Figure 5:
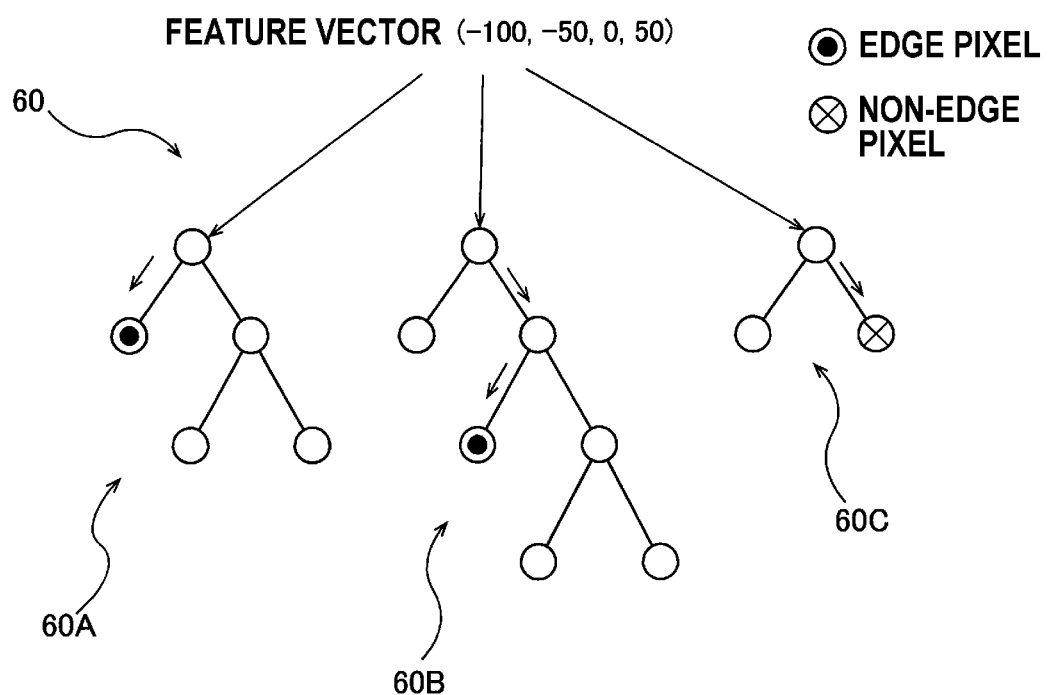
FIG. 5 is a diagram showing an example of a determination result when a certain feature vector is input to a plurality of decision trees shown in FIG. 4.

FIG. 5 is a diagram showing an example of the determination result when the feature vector (−100, −50, 0, 50) is input to the plurality of decision trees 60A, 60B, 60C shown in FIG. 4. The feature vector (−100, −50, 0, 50) is input to each of the three decision trees 60A, 60B, 60C. The first decision tree 60A and the second decision tree 60B determine that the pixel having the feature vector (−100, −50, 0, 50) is an edge pixel, and the third decision tree 60C determines that the pixel having the feature vector (−100, −50, 0, 50) is a non-edge pixel.

Figure 6:
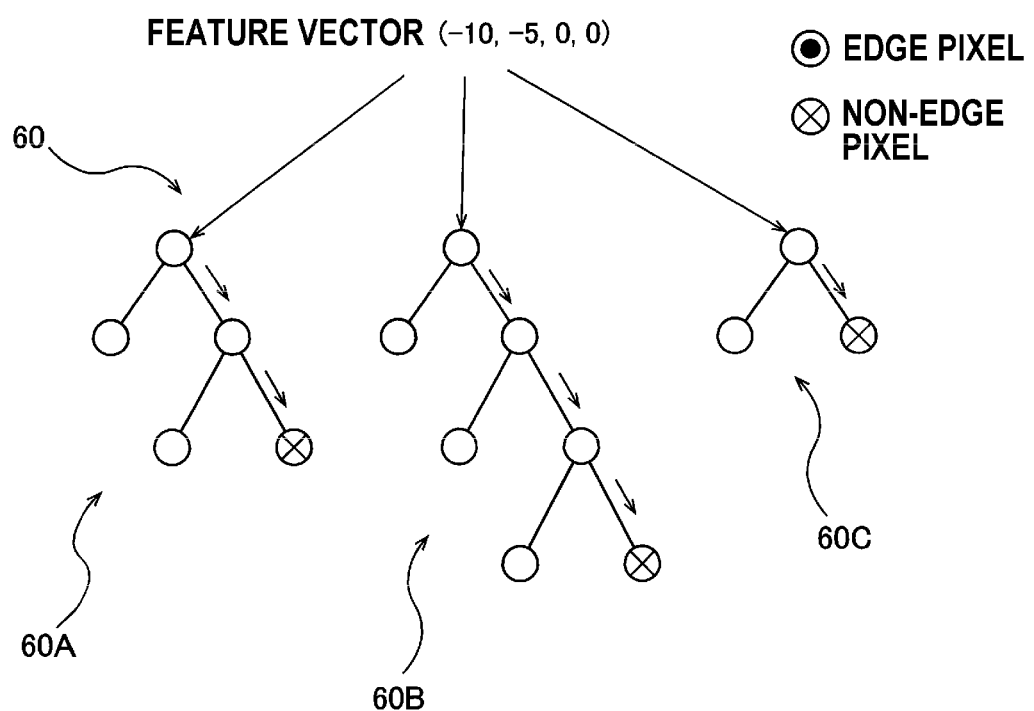
FIG. 6 is a diagram showing another example of a determination result when another feature vector is input to the plurality of decision trees shown in FIG. 4.

FIG. 6 is a diagram showing an example of the determination result when the feature vector (−10, −5, 0, 0) is input to the plurality of decision trees 60A, 60B, 60C shown in FIG. 4. The feature vector (−10, −5, 0, 0) is input to each of the three decision trees 60A, 60B, 60C. All the decision trees 60A, 60B, 60C determine that the pixel having the feature vector (−10, −5, 0, 0) is a non-edge pixel.

There are as many determination results as the number of decision trees 60A, 60B, 60C, and the determination results may differ depending on the decision trees 60A, 60B, 60C. The arithmetic system 3 adopts the determination result indicating an edge pixel or the determination result indicating a non-edge pixel, whichever has a larger number. In the example shown in FIG. 5, two of the three decision trees 60A, 60B, and 60C output the determination result indicating an edge pixel, while the other one outputs the determination result indicating a non-edge pixel. In this case, the arithmetic system 3 adopts the determination results with the larger number, and determines that the pixel having the input feature vector (−100, −50, 0, 50) is an edge pixel. In the example shown in FIG. 6, all the decision trees 60A, 60B, 60C output the determination result indicating a non-edge pixel. In this case, the arithmetic system 3 determines that the pixel having the input feature vector (−10, −5, 0, 0) is a non-edge pixel.

The decision tree has the advantage that the machine learning can be completed faster than other models, such as neural network. For example, the machine learning for constructing a plurality of decision trees using training data is completed in about one to five minutes. Therefore, using the model 60 of the decision trees can shorten a time from the start of the machine learning to the generation of the virtual edge 55.

In general, an edge shape of a pattern will be slightly different from wafer to wafer, even if the pattern is produced from the same design data. A model that has been created using images of patterns on one wafer may fail to detect an edge of a pattern on other wafer. According to this embodiment, the real pattern used for producing the training data and the target pattern 51 whose virtual edge 55 is to be generated are formed on the same wafer (workpiece) W. Specifically, the machine learning for the model 60 in the learning phase and the generation of the virtual edge 55 in the edge detection phase are performed using images of the same wafer (workpiece) W. Therefore, the arithmetic system 3 can generate the virtual edge 55 of the target pattern 51 with high accuracy by using the model 60 constructed by the machine learning using the training data.

In the present embodiment, the plurality of decision trees are used as the model 60 constructed by the machine learning, while the present invention is not limited to the present embodiment. In one embodiment, the model 60 constructed by the machine learning may be a model constituted of a support vector machine or a neural network. In the case where the model 60 is a neural network, the feature vector is input to an input layer of the neural network, and the determination result is output from an output layer of the neural network. Deep learning is suitable for the machine learning for the neural network.

Figure 7:
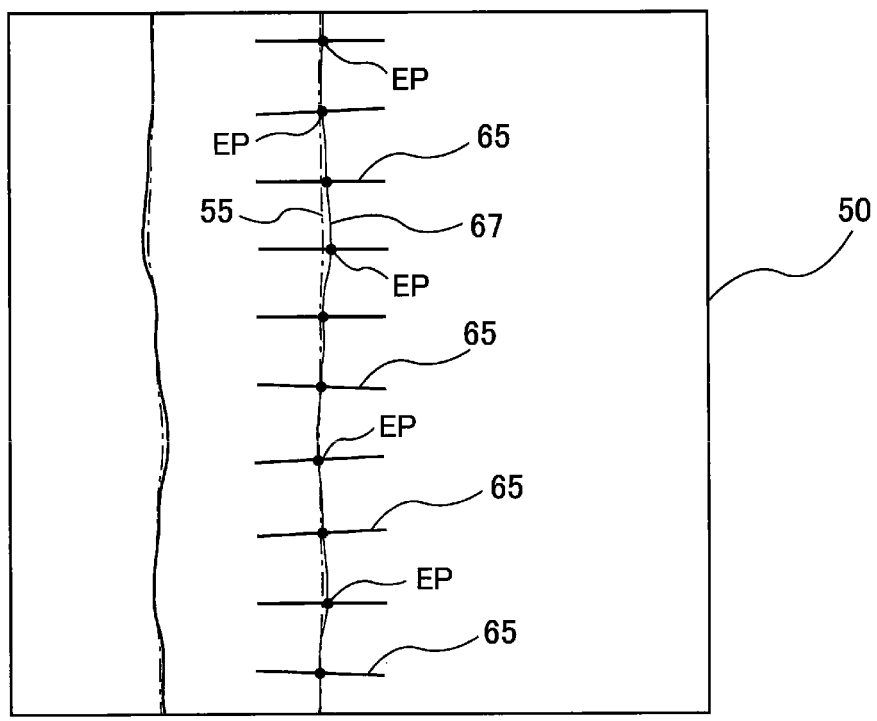
FIG. 7 is a diagram showing multiple search lines each extending in a normal direction with respect to a virtual edge.
Figure 25:
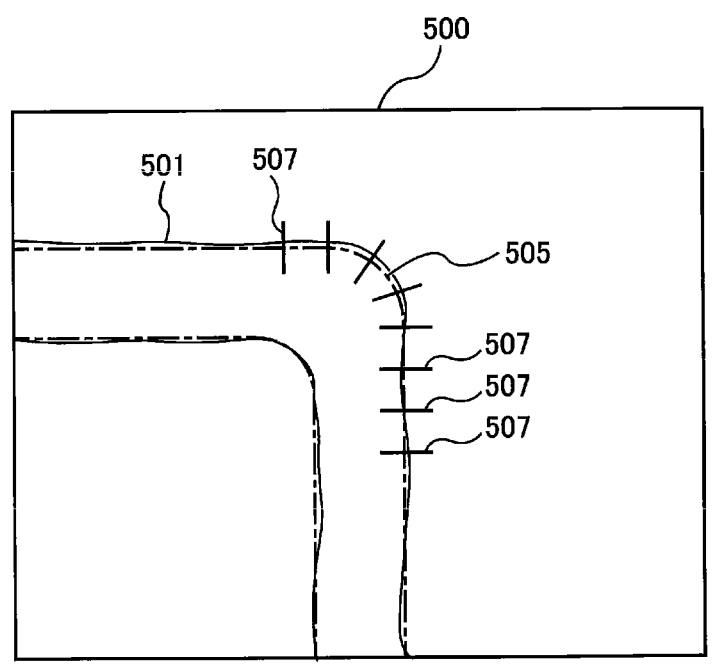
FIG. 25 is a schematic diagram showing a CAD pattern superimposed on a pattern on an image.
Figure 26:
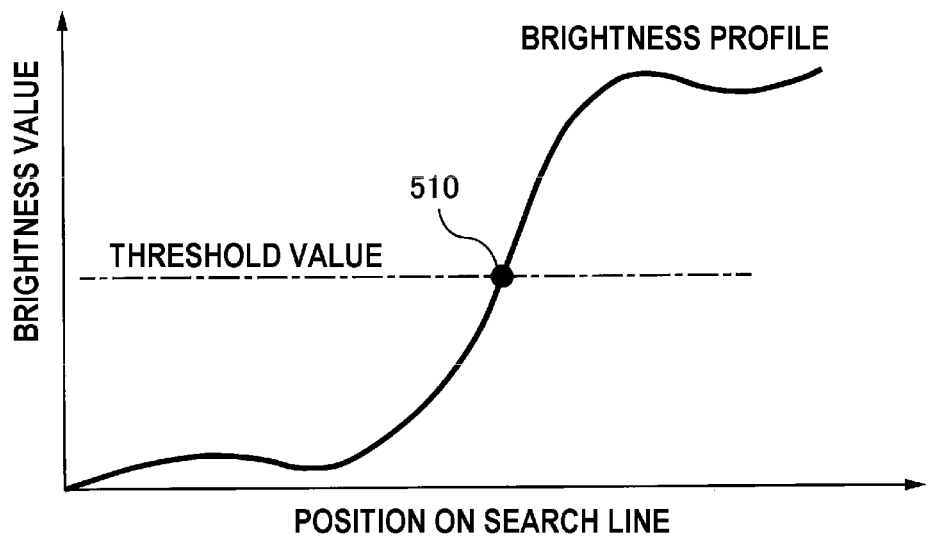
FIG. 26 is a diagram showing a brightness profile along a search line shown in FIG. 25.
Figure 27:
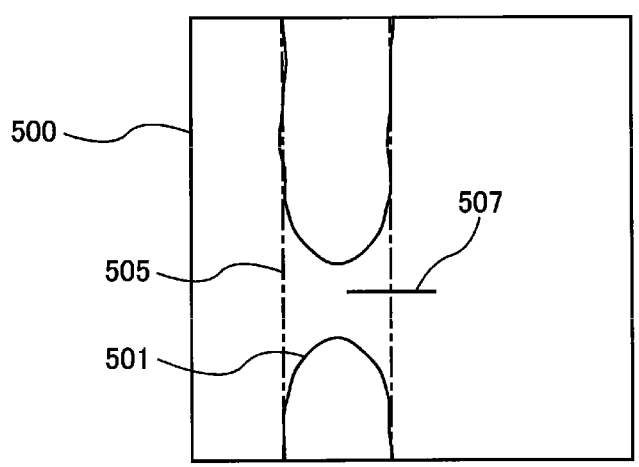
FIG. 27 is a diagram showing an example of a defective pattern.
Figure 28:
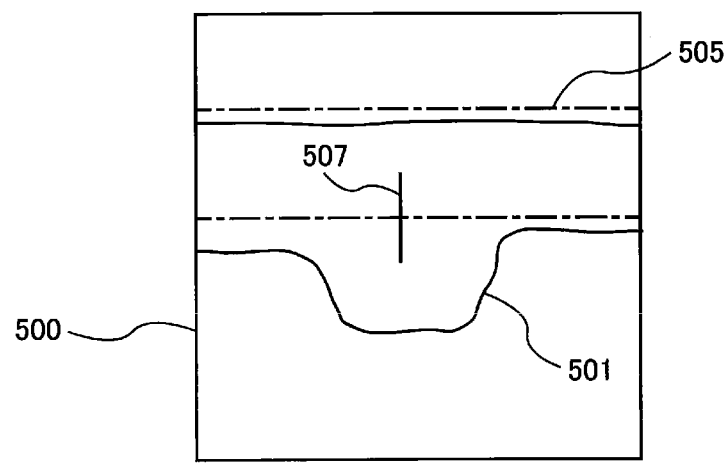
FIG. 28 is a diagram showing another example of a defective pattern.
Figure 29:
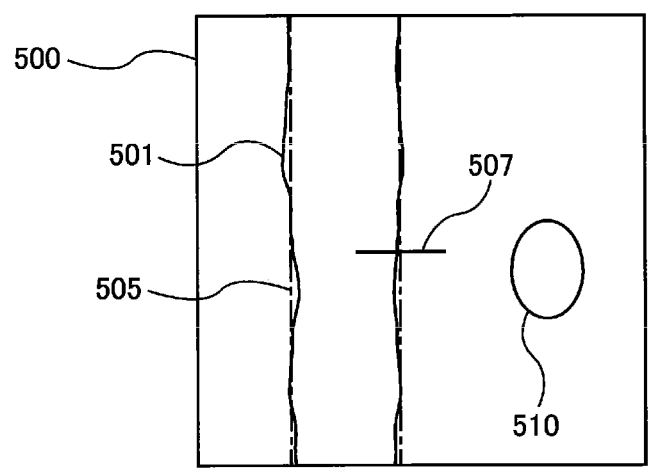
FIG. 29 is a diagram showing still another example of a defective pattern.

The virtual edge 55 shown in FIG. 3 is expected to have a shape very close to the edge of the target pattern 51 shown in FIG. 2. In one embodiment, the arithmetic system 3 may further perform a process of detecting the edge of the target pattern 51 based on the virtual edge 55. The edge detection for the target pattern 51 is performed in the same manner as the conventional edge detection method described with reference to FIGS. 25 and 26. However, the virtual edge 55 is used instead of the CAD pattern. Specifically, as shown in FIG. 7, the arithmetic system 3 generates multiple brightness profiles of the objective image 50 along multiple search lines 65 each extending in the normal direction with respect to the virtual edge 55. The arithmetic system 3 determines multiple edge points EP based on the brightness profiles, and connects the multiple edge points EP with a line to generate a renewed edge 67.

Figure 8:
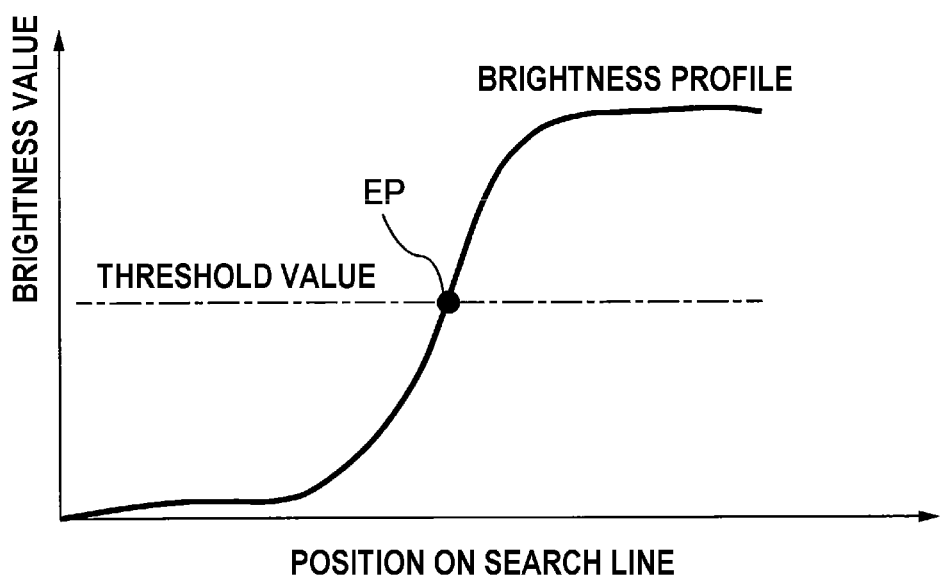
FIG. 8 is a diagram showing an example of a brightness profile along one of the search lines shown in FIG. 7.

FIG. 8 is a diagram showing an example of the brightness profile along one of the search lines 65 shown in FIG. 7. The arithmetic system 3 determines the edge point EP whose brightness value on the brightness profile is equal to a threshold value. As shown in FIG. 7, the arithmetic system 3 determines multiple edge points EP on the brightness profiles along the multiple search lines 65, connects these edge points EP with a line to generate the renewed edge 67, and draw the renewed edge 67 on the objective image 50. The renewed edge 67 is expected to have a shape very close to the actual edge of the target pattern 51 (see FIG. 2).

Next, the training data used for the machine learning for constructing the model 60 will be described. As described above, the training data is produced from images of a plurality of real patterns on the wafer W having the target pattern 51 formed thereon whose virtual edge 55 is to be generated. The arithmetic system 3 selects a plurality of training patterns from the design data. The design data (also referred to as CAD data) is design data for the patterns formed on the wafer W.

Figure 9:
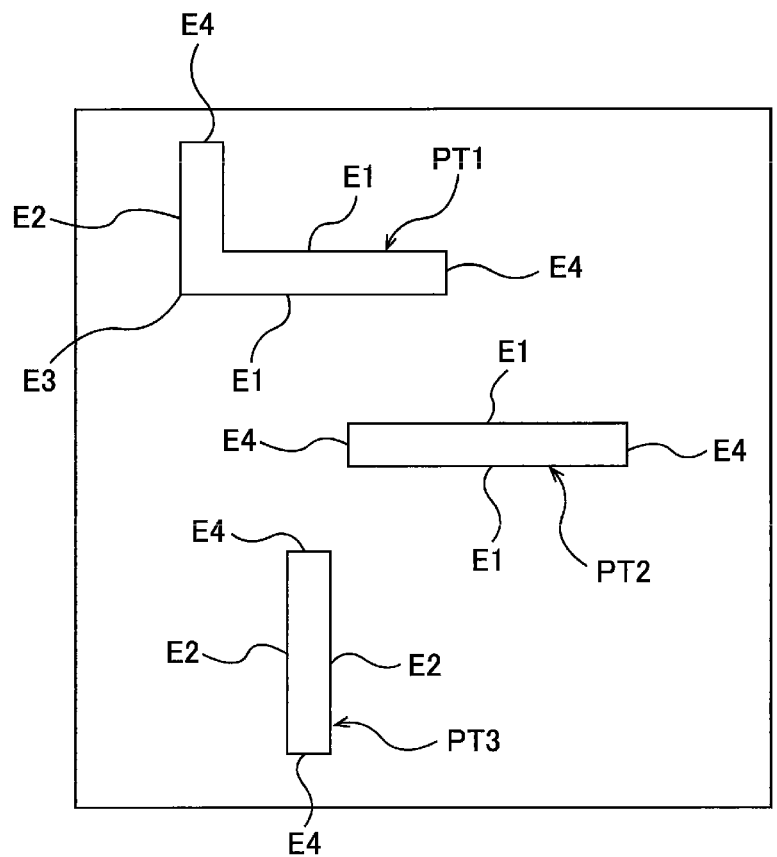
FIG. 9 is a schematic diagram showing an example of a training pattern used for producing training data.

In order to improve the edge determination accuracy of the model 60, it is desirable that the training data is produced from images of patterns having various edge shapes. From this point of view, the training patterns used to produce the training data include, as shown in FIG. 9, patterns PT1, PT2, PT3 having edges E1 extending in a first direction, edges E2 extending in a second direction perpendicular to the first direction, corner edge(s) E3, and terminal edges E4. The arithmetic system 3 extracts (selects), from the design data, the plurality of training patterns PT1, PT2, and PT3 having edges E1 to E4 having such various shapes.

Figure 10:
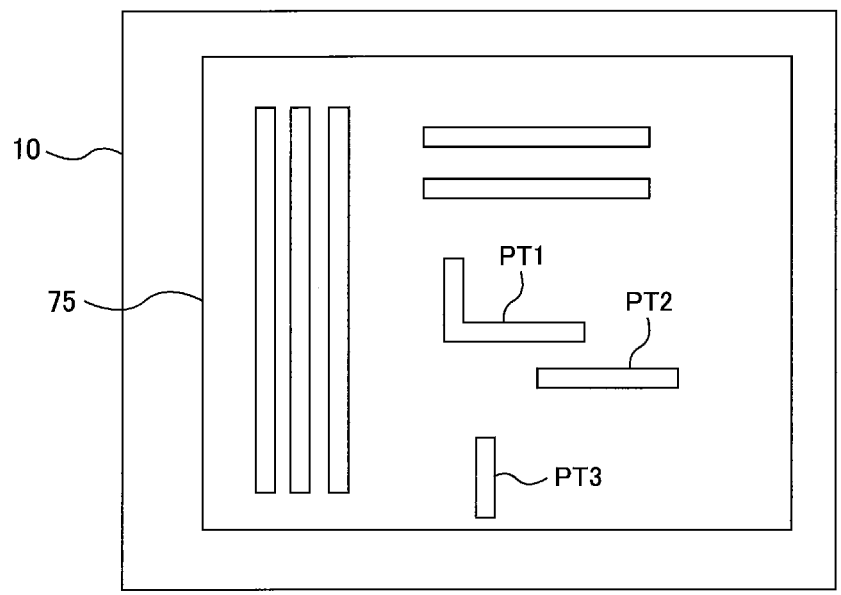
FIG. 10 is a schematic diagram showing an example of a design diagram displayed on a display screen.

The arithmetic system 3 is configured to display a design diagram drawn based on the design data on the display screen 10 (see FIG. 1). FIG. 10 is a schematic diagram showing an example of a design diagram 75 displayed on the display screen 10. The design diagram 75 includes various patterns drawn based on the design data. The user can visually check the design diagram 75 on the display screen 10 and can select the patterns PT1, PT2, and PT3 having edges extending in multiple directions as shown in FIG. 9. More Specifically, the user operates the input device 12 including the mouse 12a and the keyboard 12b shown in FIG. 1, and can select training patterns PT1, PT2, and PT3 from the plurality of patterns on the design diagram 75, as shown in FIG. 10.

The user can operate the input device 12 to delete or change a part of the training patterns PT1, PT2, PT3, or add another pattern on the design diagram 75 to the training patterns PT1, PT2, PT3.

Figure 11:
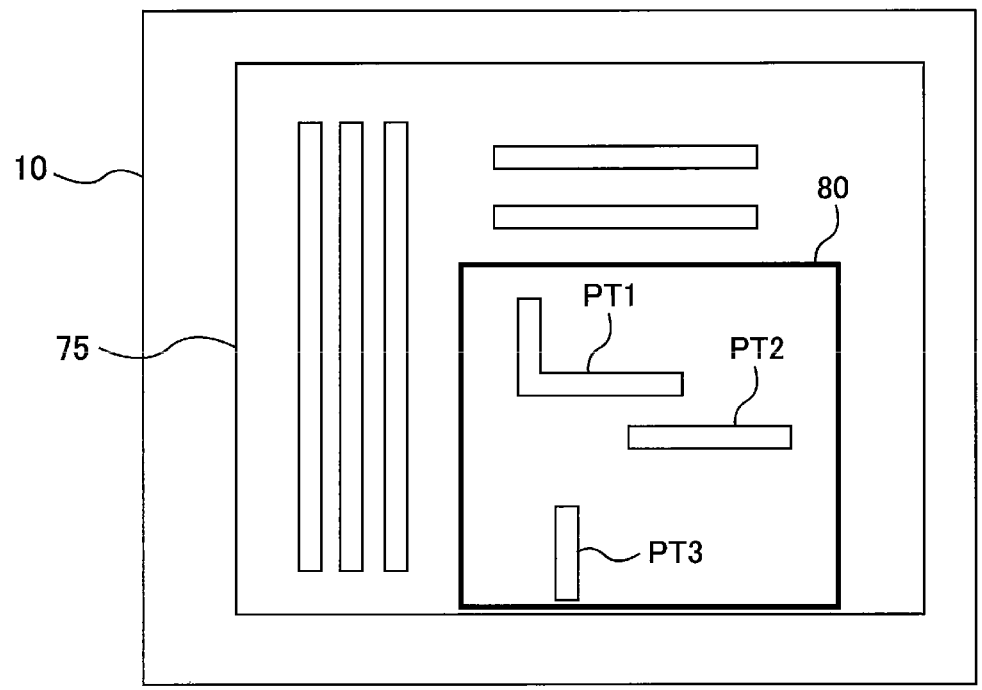
FIG. 11 is a diagram showing an embodiment in which a frame indicating an area where a selected training pattern is located is displayed on a display screen.
Figure 12:
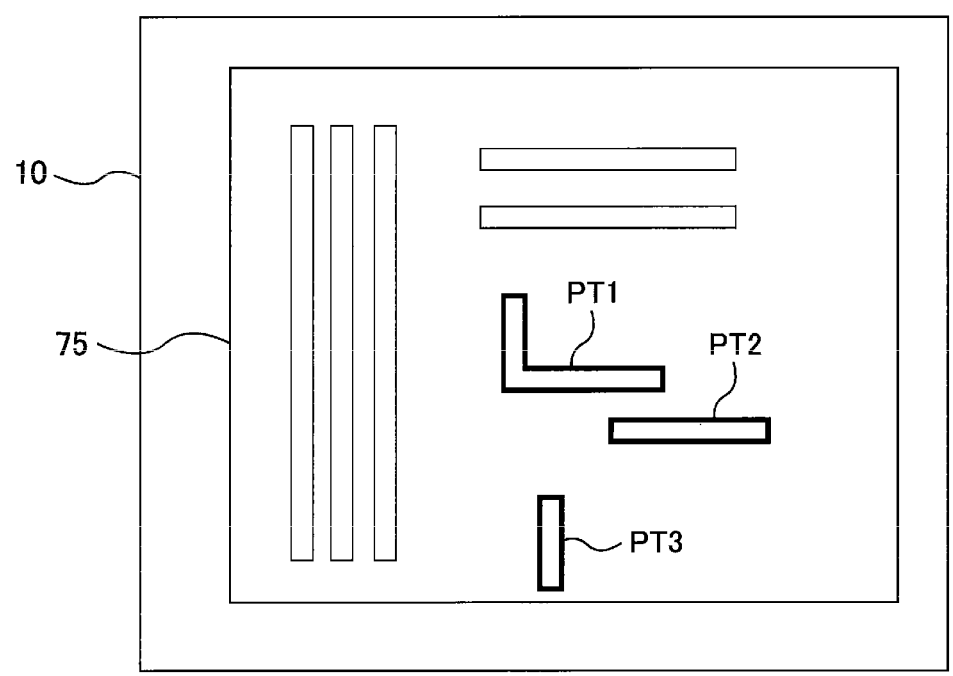
FIG. 12 is a diagram showing an embodiment in which the selected training pattern is displayed in a manner visually different from other patterns.

The arithmetic system 3 displays the selected training patterns PT1, PT2, PT3, or an area in which these patterns PT1, PT2, PT3 are located in a visually emphasized manner. For example, as shown in FIG. 11, a frame 80 indicating an area in which the selected training patterns PT1, PT2, and PT3 are located may be displayed on the display screen 10, or as shown in FIG. 12, the selected training patterns PT1, PT2, PT3 themselves may be displayed in a manner visually different from other patterns. In the example shown in FIG. 12, the selected training patterns PT1, PT2, PT are displayed with thicker lines than other patterns. In another example, the selected training patterns PT1, PT2, PT3 may be displayed in color(s) different from other patterns. The user can visually check the plurality of training patterns PT1, PT2, and PT3 on the display screen 10.

The scanning electron microscope 1 generates a plurality of training images of a plurality of real patterns that have been produced based on the plurality of selected training patterns, respectively. At this time, the scanning electron microscope 1 may generate an image of the target pattern 51 whose virtual edge 55 is to be generated. The arithmetic system 3 obtains the plurality of training images from the scanning electron microscope 1 and stores them in the memory 6.

Next, the arithmetic system 3 detects edges of real patterns on the plurality of training images. This edge detection is performed according to the conventional edge detection method described with reference to FIGS. 25 and 26. Specifically, the arithmetic system 3 generates, from the design data, a plurality of CAD patterns corresponding to the plurality of training patterns, respectively. The arithmetic system 3 may apply a corner rounding process to each CAD pattern to form rounded corner edges. Next, the arithmetic system 3 superimposes these CAD patterns on the plurality of patterns on the training images. The arithmetic system 3 generates multiple search lines each extending in the normal direction with respect to the edge of each CAD pattern, and produces multiple brightness profiles of the image along the search lines. The arithmetic system 3 determines an edge point where a brightness value on one brightness profile is equal to a threshold value. Further, the arithmetic system 3 repeats the same operation to determine multiple edge points on the brightness profiles along all the search lines. The arithmetic system 3 connects the multiple edge points with a line to determine an edge of the real pattern on the training image constituted of the line connecting the multiple edge points. In this way, the edge of the real pattern on the training image is detected (determined).

As a result of the edge detection of the real pattern on the training image, the arithmetic system 3 can label each reference pixel constituting the training image with an edge pixel or a non-edge pixel. Specifically, the arithmetic system 3 classifies reference pixels constituting the plurality of training images into first reference pixels each constituting an edge and second reference pixels that do not constitute an edge.

The arithmetic system 3 generates first feature vectors of the first reference pixels and second feature vectors of the second reference pixels. As described above, each feature vector is a multidimensional vector including a plurality of features of each reference pixel. The arithmetic system 3 produces training data including the first feature vectors, the second feature vectors, and correct answer data of these feature vectors. The correct answer data is information that identifies each pixel having a certain feature vector as either a pixel that constitutes an edge of a pattern or a pixel that does not constitute an edge. Each of the first feature vector and the second feature vector included in the training data is connected with (associated with) the correct answer data.

Figure 13:
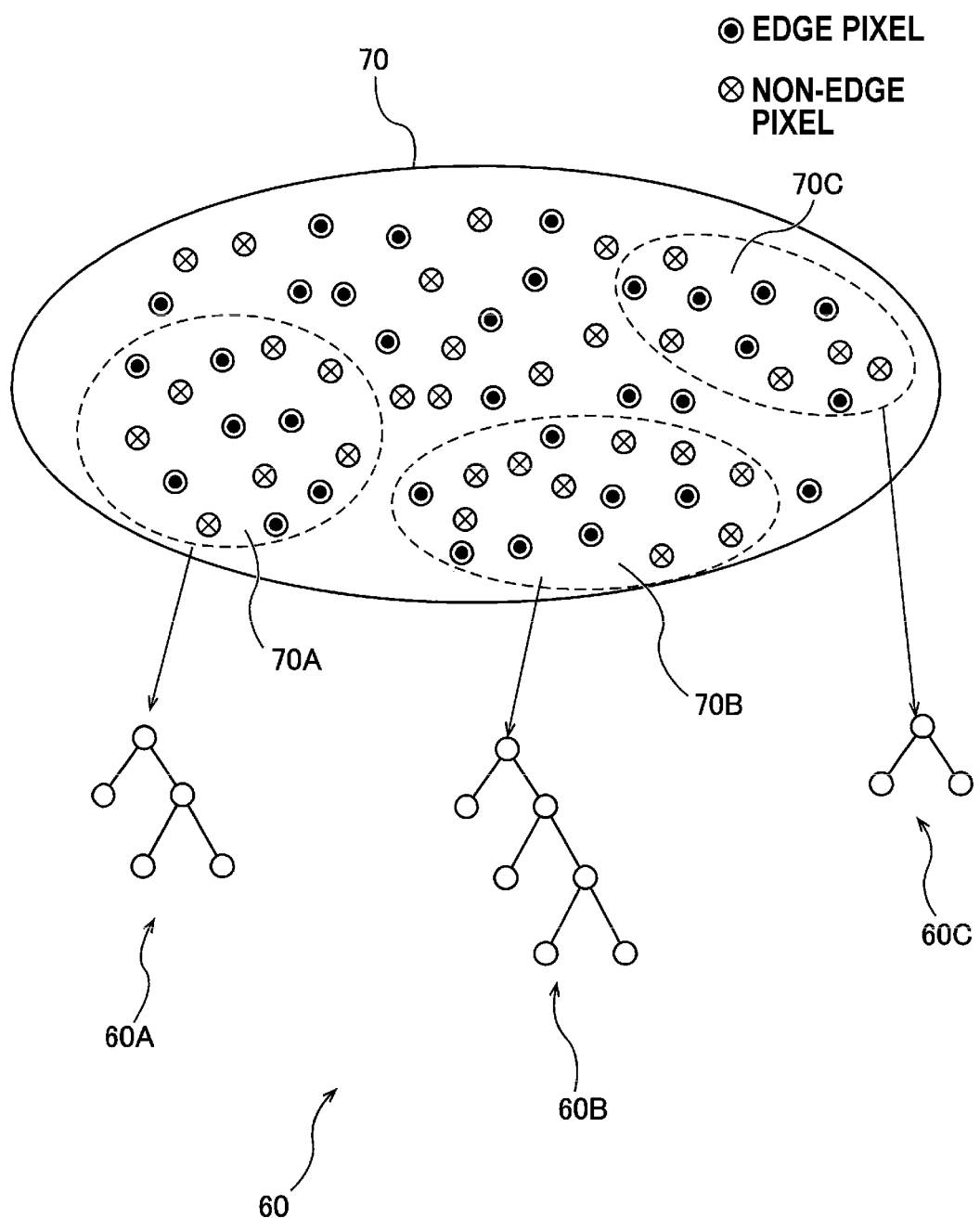
FIG. 13 is a schematic diagram showing training data including a first feature vector of a first reference pixel constituting an edge and a second feature vector of a second reference pixel that does not constitute an edge.

FIG. 13 is a schematic diagram showing training data 70 including the first feature vectors of the first reference pixels each constituting an edge and the second feature vectors of the second reference pixels that do not constitute an edge. The first feature vectors are labeled with correct data representing edge pixel, and the second feature vectors are labeled with correct data representing non-edge pixel. The arithmetic system 3 constructs the model 60 by the machine learning using the training data 70.

In this embodiment, the model 60 includes a plurality of decision trees 60A, 60B, 60C. The arithmetic system 3 creates a plurality of data groups 70A, 70B, 70C each including a plurality of first feature vectors and a plurality of second vectors randomly extracted from the training data 70, and constructs the decision trees 60A, 60B, 60C using these data groups 70A, 70B, 70C. More Specifically, the arithmetic system 3 uses the data group 70A to determine model parameters of the decision tree 60A. In the same manner, the arithmetic system 3 uses the data group 70B to determine model parameters of the decision tree 60B and uses the data group 70C to determine model parameters of the decision tree 60C.

The arithmetic system 3 uses the training data 70 to verify the model 60 including the plurality of decision trees 60A, 60B, 60C having the model parameters determined as described above. Specifically, the arithmetic system 3 inputs the first feature vector included in the training data 70 to the model 60, outputs the determination result from the model 60, and verifies whether the determination result indicates an edge pixel. Similarly, the arithmetic system 3 inputs the second feature vector included in the training data 70 to the model 60, outputs the determination result from the model 60, and verifies whether the determination result indicates a non-edge pixel. The arithmetic system 3 repeatedly performs such verification to thereby obtain a plurality of determination results, and calculates a determination accuracy which is a rate of the plurality of determination results that coincide with the correct answer data.

If the determination accuracy is equal to or higher than a set value, the arithmetic system 3 performs the generation of the virtual edge 55 using the model 60 as described above. If the determination accuracy is smaller than the set value, the arithmetic system 3 produces the training data again and performs the machine learning for the model again. In one embodiment, the arithmetic system 3 may not use the model 60 when the determination accuracy is smaller than the set value and may detect the edge of the target pattern 51 according to the conventional edge detection method described with reference to FIGS. 25 and 26.

Figure 14:
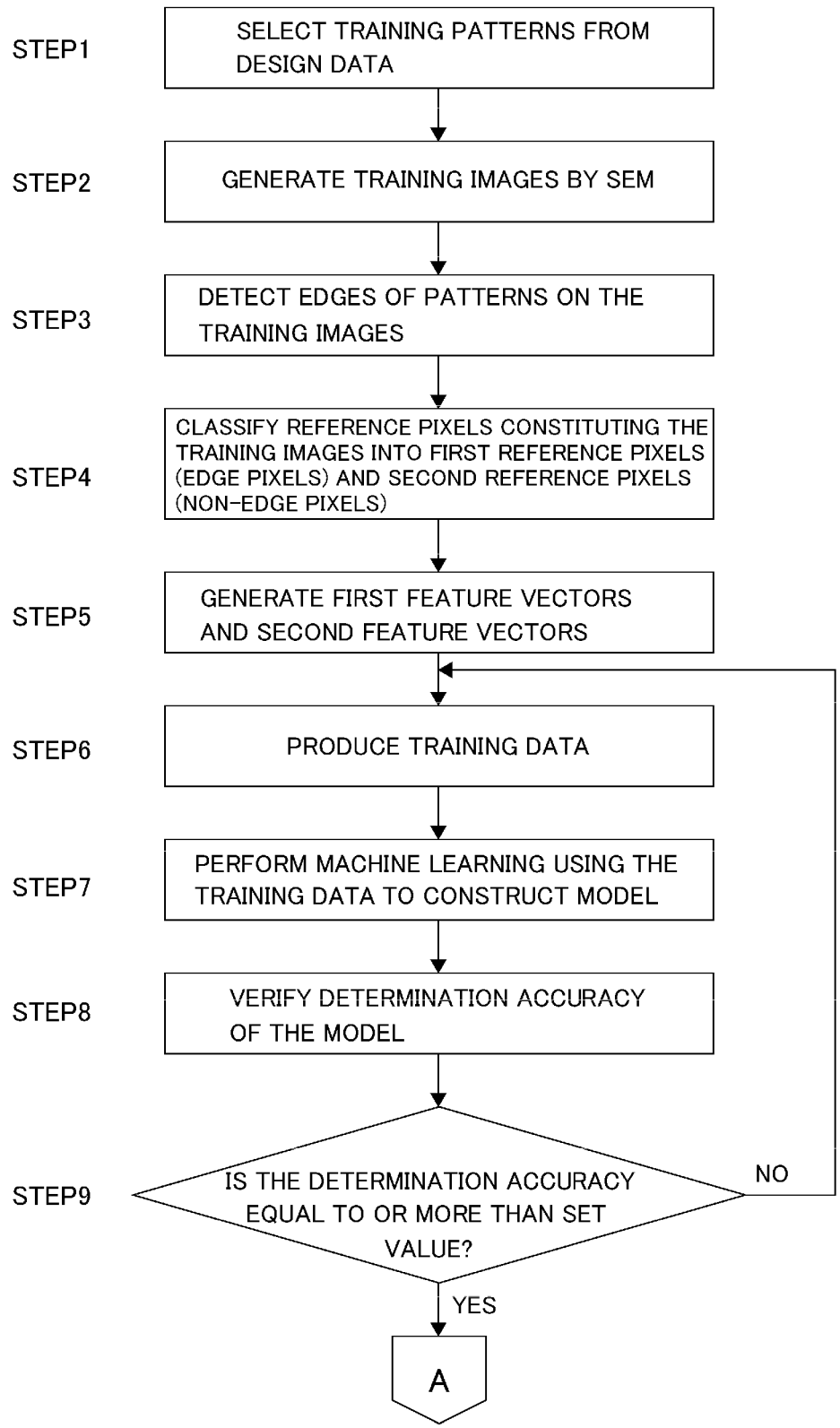
FIG. 14 is a part of a flowchart showing the operation of the pattern-edge detection apparatus.
Figure 15:
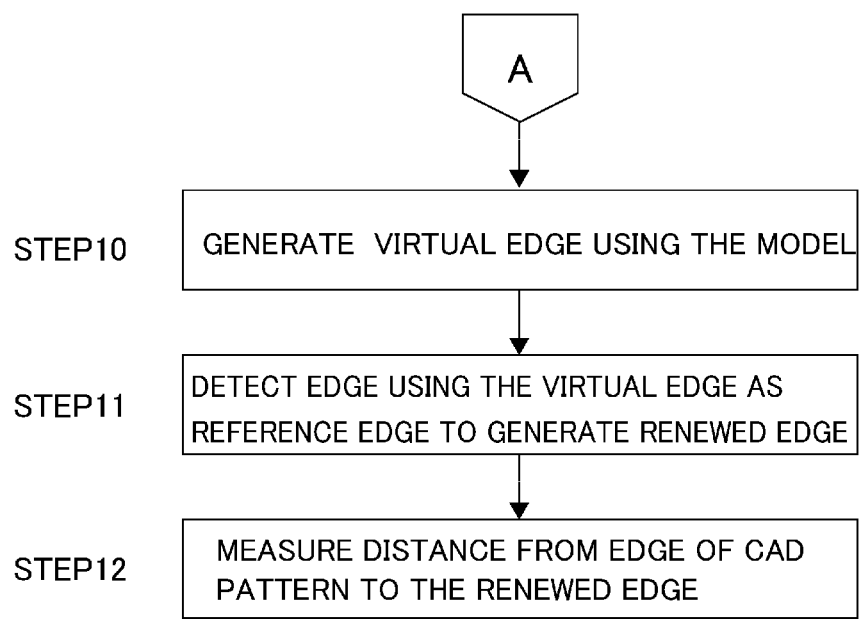
FIG. 15 is a remaining part of the flowchart showing the operation of the pattern-edge detection apparatus.

FIGS. 14 and 15 are flowcharts showing the operation of the pattern-edge detection apparatus described above.

In step 1, the arithmetic system 3 selects (extracts) the plurality of training patterns from the design data. As shown in FIG. 9, the plurality of selected training patterns include patterns having the edge E1 extending in the first direction, the edge E2 extending in the second direction perpendicular to the first direction, the corner edge E3, and the terminal edge E4.

In step 2, the scanning electron microscope 1 generates a plurality of training images of real patterns that have been produced based on the plurality of selected training patterns, respectively. At this time, the scanning electron microscope 1 may generate an image of the target pattern 51 whose virtual edge is to be generated.

In step 3, the arithmetic system 3 detects edges of the real patterns on the plurality of training images. This edge detection is performed according to the conventional edge detection method described with reference to FIGS. 25 and 26.

In step 4, the arithmetic system 3 classifies reference pixels constituting the plurality of training images into the first reference pixels each constituting an edge and the second reference pixels that do not constitute an edge.

In step 5, the arithmetic system 3 generates the plurality of first feature vectors of the plurality of first reference pixels and the plurality of second feature vectors of the plurality of second reference pixels. Specifically, the arithmetic system 3 generates a feature vector representing a plurality of features of each reference pixel.

In step 6, the arithmetic system 3 produces the training data 70 including the plurality of first feature vectors, the plurality of second feature vectors, and the correct answer data of these feature vectors (see FIG. 13).

In step 7, the arithmetic system 3 performs the machine learning using the training data 70 to construct the model 60. More Specifically, the arithmetic system 3 adjusts the model parameters such that when a certain feature vector is input to the model 60, the model 60 outputs a correct determination result.

In step 8, the arithmetic system 3 verifies the determination accuracy of the model 60 using the training data 70. Specifically, the arithmetic system 3 inputs a plurality of feature vectors included in the training data 70 into the model 60 one by one, and outputs a plurality of determination results from the model 60. The calculation system 3 calculates the determination accuracy, which is the rate of the plurality of determination results that coincide with the correct answer data.

In step 9, the arithmetic system 3 compares the determination accuracy with the set value. If the determination accuracy is smaller than the set value, the operation flow returns to the step 6. In one embodiment, when the determination accuracy is smaller than the set value, the operation flow may not return to the step 6, and the arithmetic system 3 may detect the edge of the target pattern 51 according to the conventional edge detection method described with reference to FIGS. 25 and 26.

If the determination accuracy is equal to or higher than the set value in the step 9, the arithmetic system 3 generates a virtual edge using the model 60 in step 10, as shown in FIG. 15. Specifically, the arithmetic system 3 generates a feature vector representing a plurality of features of each pixel of the objective image 50, inputs the feature vector into the model 60, and outputs from the model 60 a determination result indicating an edge pixel or a non-edge pixel. The arithmetic system 3 generates the virtual edge by connecting a plurality of pixels, each having feature vector that has obtained a determination result indicating an edge pixel, with a line.

In step 11, the arithmetic system 3 performs the edge detection using the virtual edge as a reference edge according to the conventional edge detection method, and generates a renewed edge. Specifically, as shown in FIGS. 7 and 8, the arithmetic system 3 generates multiple search lines 65 each extending in the normal direction with respect to the virtual edge 55, produces multiple brightness profiles of the objective image 50 along these search lines 65, determines multiple edge points EP based on the multiple brightness profiles, and connects the multiple edge points EP with a line to generate the renewed edge 67.

Figure 16:
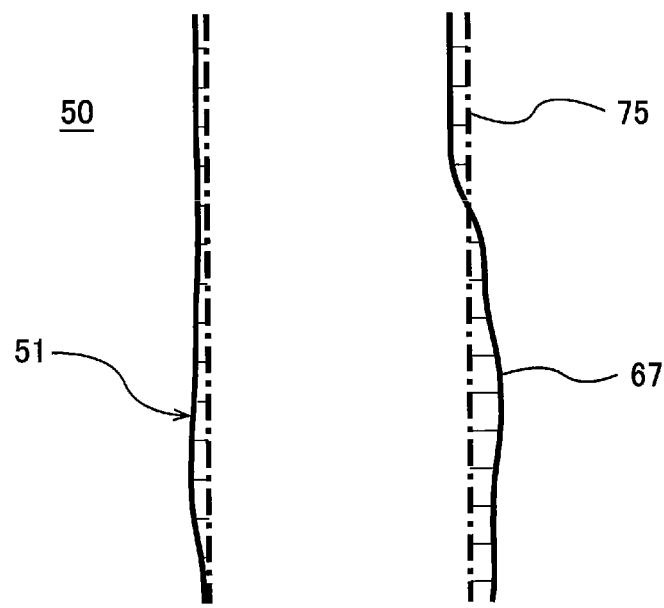
FIG. 16 is a diagram illustrating an embodiment of measuring a distance from an edge of a CAD pattern to a renewed edge.

In step 12, the arithmetic system 3 checks how far the renewed edge 67 generated in the step 11 is located apart from an edge of a CAD pattern. Specifically, as shown in FIG. 16, the arithmetic system 3 generates from the design data a CAD pattern 75 corresponding to the target pattern 51, superimposes the CAD pattern 75 onto the target pattern 51 on the objective image 50, and measures a distance from an edge of the CAD pattern 75 to the renewed edge 67 of the target pattern 51 at a plurality of measurement points. The plurality of measurement points are arranged on the edge of the CAD pattern. According to this step 12, it is possible to know how much the renewed edge 67 deviates from the design data (or how much the renewed edge 67 is close to the design data).

The arithmetic system 3 including at least one computer operates according to the instructions contained in the program electrically stored in the memory 6. Specifically, the arithmetic system 3 performs the steps of: instructing the scanning electronic microscope 1 to generate the objective image 50 of the target pattern 51 formed on the workpiece; generating a feature vector representing a plurality of features of each pixel of the objective image 50; inputting the feature vector into the model 60 constructed by the machine learning; outputting from the model 60 a determination result indicating whether the pixel having the feature vector is an edge pixel or a non-edge pixel; and connecting a plurality of pixels, each having a feature vector that has obtained the determination result indicating an edge pixel, with a line to generate the virtual edge 55.

The program for causing the arithmetic system 3 to perform these steps is stored in a computer-readable storage medium which is a non-transitory tangible medium, and is provided to the arithmetic system 3 via the storage medium. Alternatively, the program may be input to the arithmetic system 3 via a communication network, such as the Internet or a local area network.

The pattern edge used for the training data has deviations. Moreover, a boundary line between the edge and a non-edge region on the image is unclear. The model (hereinafter referred to as edge detection model) that has been produced using such training data may fail to detect an edge or may erroneously detect an edge. Creating an accurate model requires a large amount of training data for the machine learning, and as a result, the machine learning takes a very long time.

Figure 17:
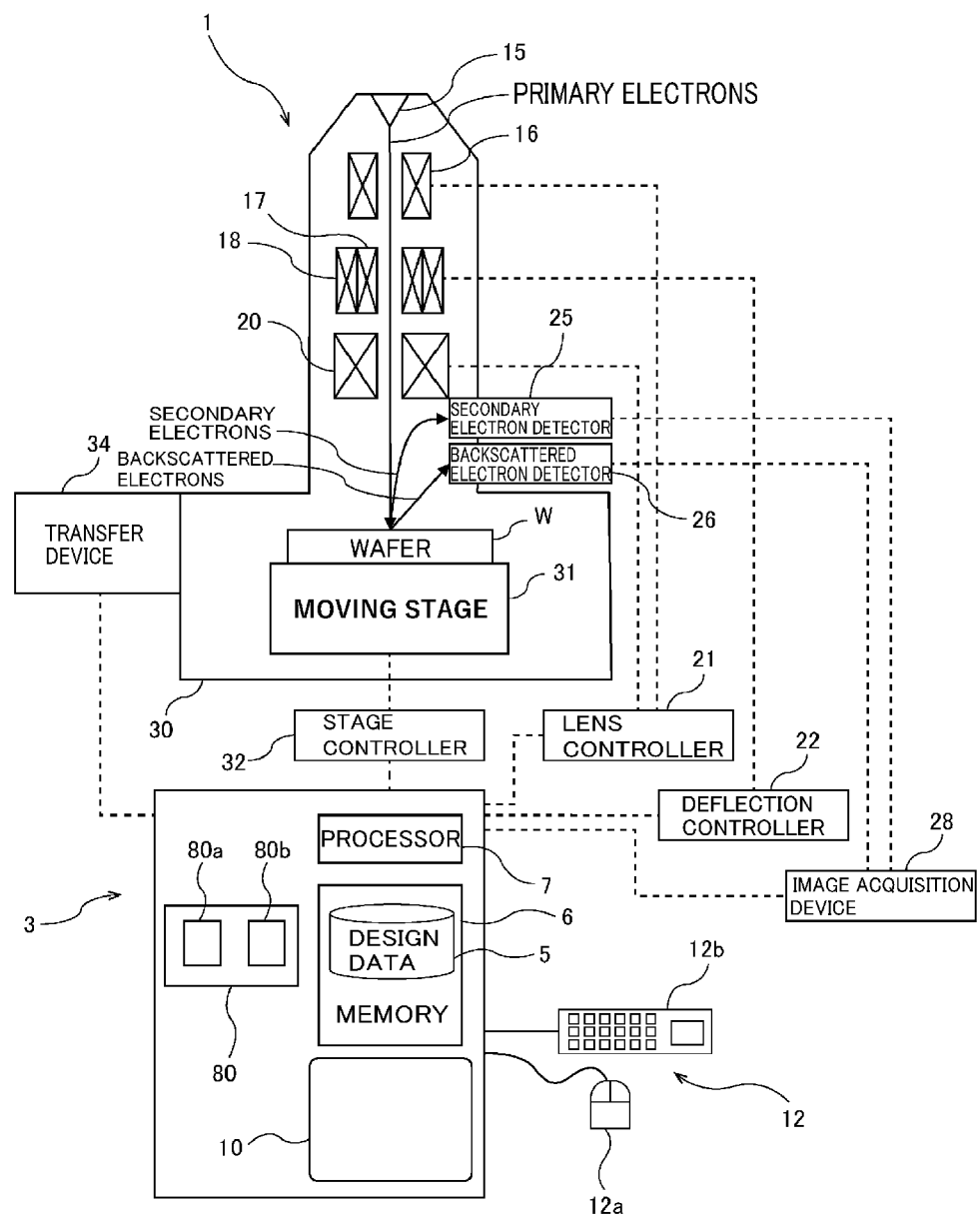
FIG. 17 is a schematic diagram showing an embodiment of a pattern-edge detection apparatus.

Thus, embodiments described below provide a method and an apparatus capable of producing an accurate edge detection model without requiring a long time in the machine learning. FIG. 17 is a schematic diagram showing another embodiment of the pattern-edge detection apparatus. Configurations and operations of the present embodiment, which will not be particularly described, are the same as those of the embodiments described with reference to FIGS. 1 to 16, and the duplicated descriptions thereof will be omitted.

The arithmetic system 3 includes a model generating apparatus 80 configured to generate an edge detection model for detecting an edge of a pattern formed on a workpiece W. The image acquisition device 28 is coupled to the model generating apparatus 80.

The model generating apparatus 80 is composed of at least one computer. The model generating apparatus 80 includes a memory 80a storing programs therein, and a processor 80b configured to perform arithmetic operations according to instructions included in the programs. The memory 80a includes a main memory, such as a RAM, and an auxiliary memory, such as a hard disk drive (HDD) or a solid state drive (SSD). Examples of the processor 80b include a CPU (central processing unit) and a GPU (graphic processing unit). However, the specific configuration of the model generating apparatus 80 is not limited to these examples. The memory 80a may be integrated with the memory 6, and the processor 80b may be integrated with the processor 7.

The model generating apparatus 80 is configured to produce, by the machine learning, an edge detection model for detecting an edge of a pattern on an image sent from the image acquisition device 28. The producing of the edge detection model will be described below.

Figure 18:
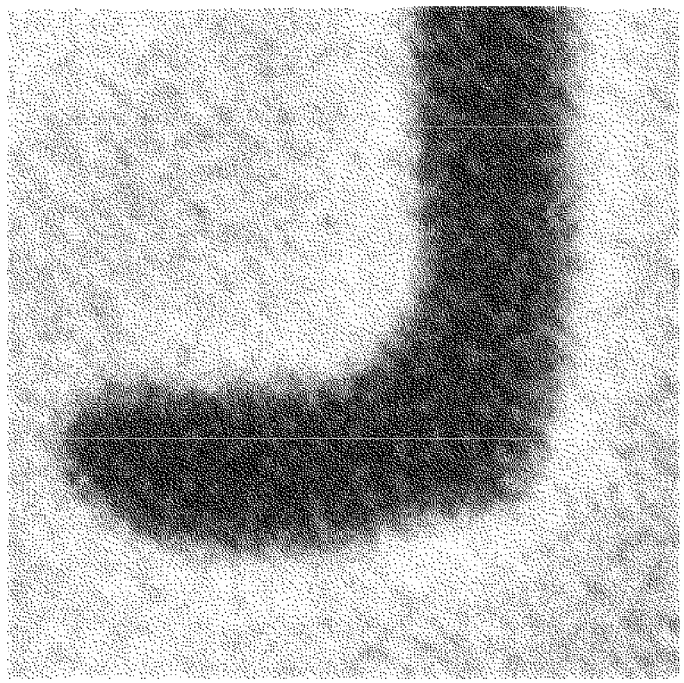
FIG. 18 is a diagram showing an example of an image of a workpiece on which a pattern is formed.

First, the workpiece W on which pattern is formed is prepared. The scanning electron microscope 1 generates a training image of the workpiece W, and the model generating apparatus 80 obtains the training image from the scanning electron microscope 1. FIG. 18 is a diagram showing an example of the training image of the workpiece W on which the pattern is formed. In the example shown in FIG. 18, a plurality of patterns appear in the training image. These patterns are training patterns used for the training data. The model generating apparatus 80 detects an edge of a pattern on the training image. A known image processing technique, such as Sobel filter or Canny method, is used to detect the edge. Alternatively, the edge detection may be performed according to the conventional edge detection method described with reference to FIGS. 25 and 26. In one embodiment, the user may manually correct the detected edge. Further, in one embodiment, the edge may be drawn by the user.

Figure 19:
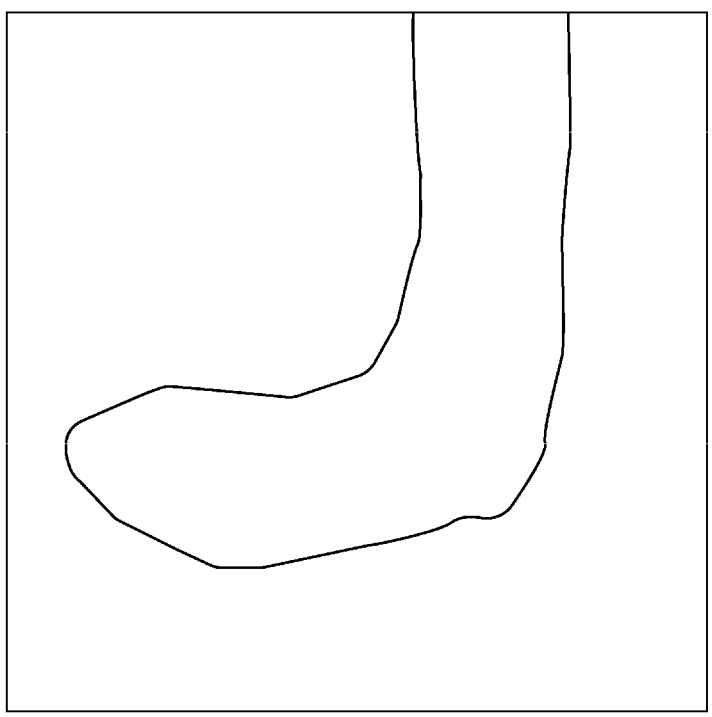
FIG. 19 is a diagram showing a detected edge.
Figure 20:
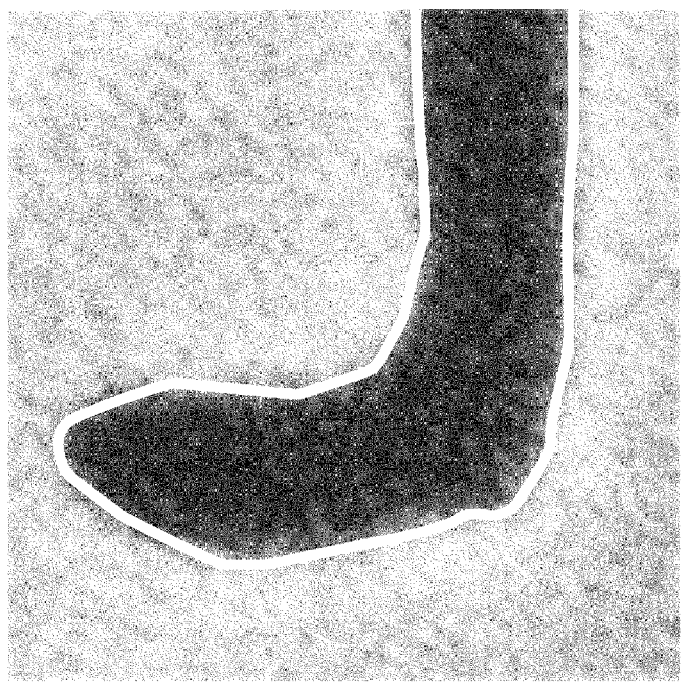
FIG. 20 is a diagram in which the detected edge shown in FIG. 19 is superimposed on the image shown in FIG. 18.

FIG. 19 is a diagram showing the detected edge. As shown in FIG. 19, the detected edge is expressed by line. The model generating apparatus 80 superimposes the detected edge on the training image of the workpiece W. FIG. 20 is a diagram in which the detected edge shown in FIG. 19 is superimposed on the training image shown in FIG. 18.

Next, the model generating apparatus 80 generates a feature vector representing a plurality of features of each pixel constituting the training image shown in FIG. 18. The feature vector is a multidimensional vector including a plurality of features of each pixel. The features are numerical values representing a characteristic of each pixel. In the present embodiment, the plurality of features of each pixel are differences between a brightness value of that pixel and brightness values of other pixels. The brightness value is, in one example, a discrete numerical value ranging from 0 to 255 according to a gray scale. In this embodiment, the other pixels are adjacent pixels. In one embodiment, the other pixels may be non-adjacent pixels.

Figure 21:
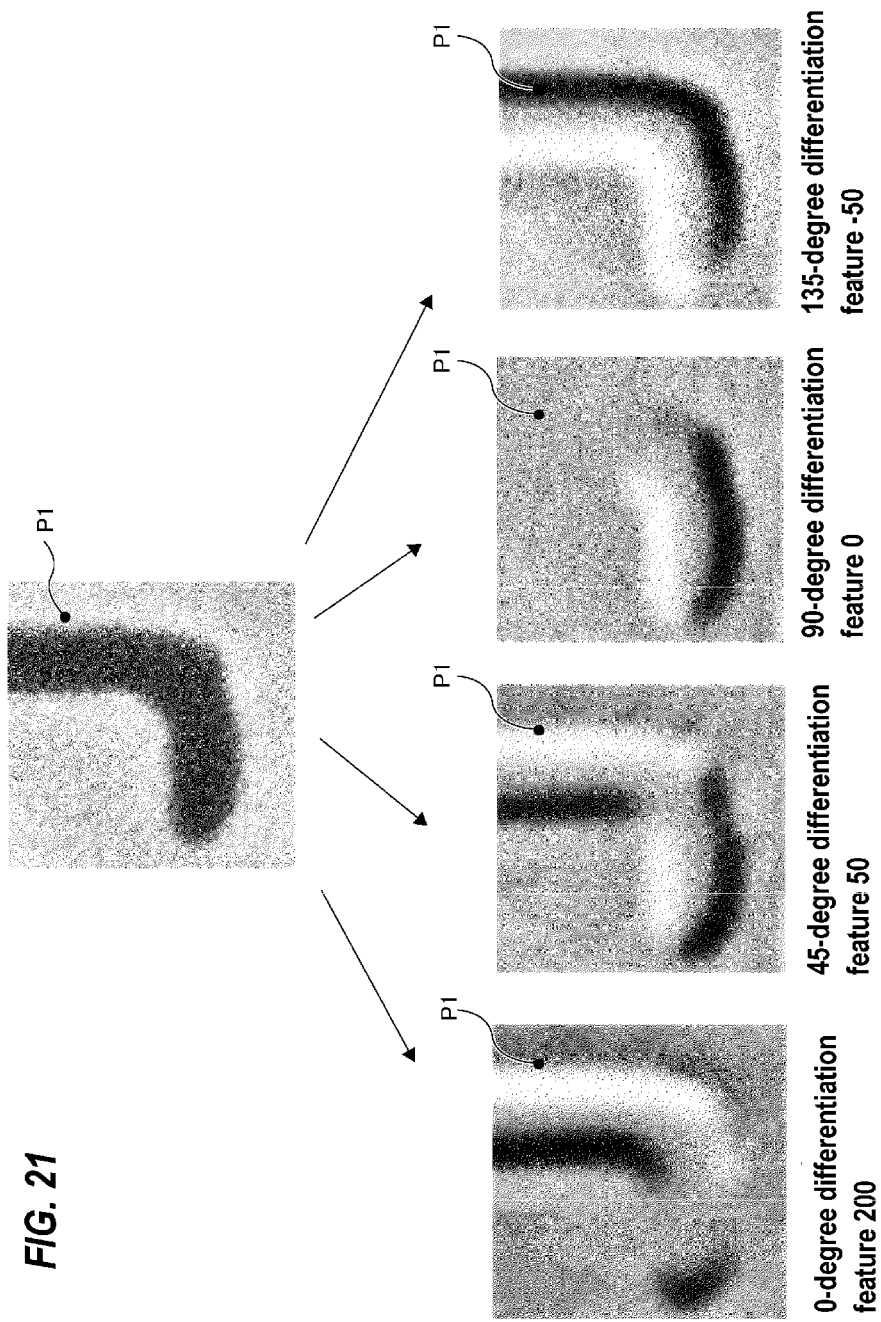
FIG. 21 is a diagram illustrating an embodiment of calculating a feature of a pixel.

An embodiment for calculating features of a pixel will be described with reference to FIG. 21. As shown in FIG. 21, the model generating apparatus 80 applies a differential filter to the training image and calculates the features of each pixel. More Specifically, the model generating apparatus 80 differentiates brightness values of pixels constituting the training image along multiple directions, and calculates, for each pixel, a feature constituted of a difference in the brightness value between two pixels arranged in each direction.

In the example shown in FIG. 21, the model generating apparatus 80 differentiates the brightness values of the pixels along the directions of 0 degrees, 45 degrees, 90 degrees, and 135 degrees. Specifically, the model generating apparatus 80 calculates a difference in brightness value between pixels arranged in the 0-degree direction, a difference in brightness value between pixels arranged in the 45-degree direction, a difference in brightness value between pixels arranged in the 90-degree direction, and a difference in brightness value between pixels arranged in the 135-degree direction. Therefore, the features constituted of four numerical values are determined for each pixel. For example, features of a pixel denoted by a reference numeral P1 in FIG. 21 are represented by a feature vector composed of 200, 50, 0, −50. It should be noted that angles of differentiation, the number of angles, and the number of features per pixel are not limited to this embodiment.

Figure 22:
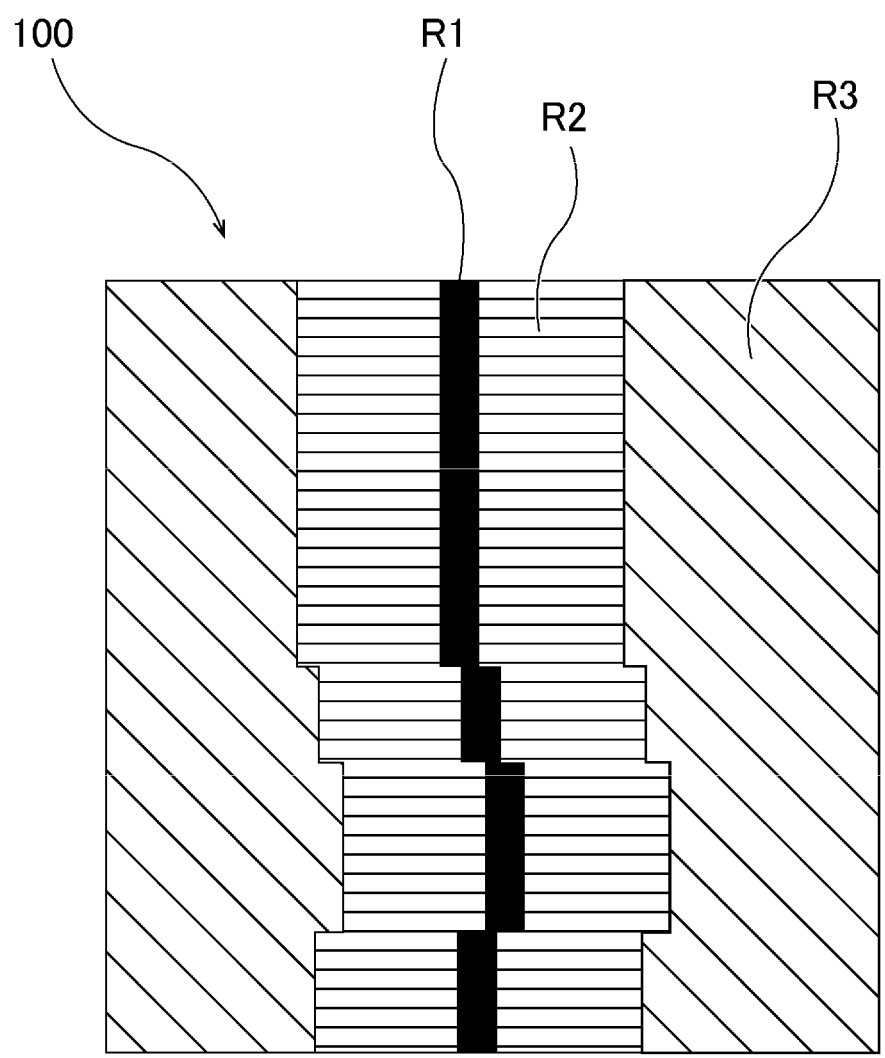
FIG. 22 is a diagram explaining an operation of dividing a target area in an image into an edge region, a near-edge region, and a non-edge region.

Next, as shown in FIG. 22, the model generating apparatus 80 divides a target region 100 in the training image into an edge region R1, a near-edge region R2, and a non-edge region R3. The target area 100 shown in FIG. 22 is a part of the training image of the workpiece W shown in FIG. 18. More Specifically, the target region 100 shown in FIG. 22 is a region including the edge of the pattern on the training image shown in FIG. 18. The edge region R1 is a region including pixels constituting the detected edge shown in FIG. 19. A width of the edge region R1 is constant. For example, the width of the edge region R1 may be a width corresponding to one pixel, or may be a width corresponding to a predetermined numbers (for example, three) of pixels.

The non-edge region R3 is located away from the edge region R1 by a predetermined number of pixels. The near-edge region R2 is located between the edge region R1 and the non-edge region R3. Specifically, the near-edge region R2 is adjacent to the edge region R1 and the non-edge region R3, and extends along the edge region R1 and the non-edge region R3. A width of the near-edge region R2 is constant. In one embodiment, the width of the near-edge region R2 is larger than the width of the edge region R1. Typically, the edge region R1 is smaller than the near-edge region R2, and the near-edge region R2 is smaller than the non-edge region R3.

The model generating apparatus 80 produces training data including a plurality of feature vectors of a plurality of pixels in the edge region R1, a plurality of feature vectors of a plurality of pixels in the near-edge region R2, and a plurality of feature vectors of a plurality of pixels in the non-edge region R3. The model generating apparatus 80 produces an edge detection model by the machine learning using the training data. Examples of the edge detection model include decision tree and neural network. Examples of the machine learning include decision tree learning and deep learning.

The training data includes correct answer data (or correct label) for each pixel. This correct answer data is information that identifies each pixel as either a pixel that constitutes an edge of a pattern or a pixel that does not constitute an edge. The pixels in the edge region R1 are pixels that constitute an edge, and the pixels in the near-edge region R2 and the non-edge region R3 are pixels that do not constitute an edge. The machine learning optimizes parameters (e.g., weighting factors) of the edge detection model such that, when a feature vector is input to the edge detection model, the edge detection model can correctly determine whether a pixel with the input feature vector is an edge pixel or a non-edge pixel. The edge detection model created by the machine learning in this way can determine whether a pixel is an edge pixel or a non-edge pixel based on the feature vector of that pixel.

According to this embodiment, the machine learning uses the training data that inevitably includes pixels in the edge region R1, pixels in the near-edge region R2, and pixels in the non-edge region R3. In particular, the pixels in the near-edge region R2, which are considered difficult to be determined, are included in the training data. Therefore, the edge detection model created by the machine learning can accurately determine whether or not a given pixel constitutes an edge.

If the number of pixels in the non-edge region R3 included in the training data is much larger than the number of pixels in the edge region R1 included in the training data, the algorithm of the edge detection model produced using such training data is biased toward non-edge pixel detection. As a result, the edge detection model may not correctly determine that the input pixel is an edge pixel. Therefore, in order to improve the edge detection accuracy of the edge detection model, it is preferable that pixels used in the machine learning for the edge detection model evenly include edge pixels (i.e., pixels in the edge region R1) and non-edge pixels (i.e., pixels in the near-edge region R2 and the non-edge region R3).

From this point of view, where the number of pixels in the edge region R1 is denoted by A, and the sum of the number of pixels in the near-edge region R2 and the number of pixels in the non-edge region R3 is denoted by B, a value (A/B) obtained by dividing the number A by the number B is a predetermined numerical value. The value (A/B) obtained by dividing the number A by the number B is in a range of 0.6 to 1.5. In order to improve the edge detection accuracy of the edge detection model, in one embodiment, the number A of pixels in the edge region R1 included in the training data is equal to the sum B of the number of pixels in the near-edge region R2 and the number of pixels in the edge region R3 included in the training data.

The feature vectors of the pixels in the near-edge region R2 have values between the feature vectors of the pixels in the edge region R1 and the feature vectors of the pixels in the non-edge region R3. Therefore, it is difficult to accurately determine whether a pixel in the near-edge region R2 is an edge pixel or a non-edge pixel. From another point of view, the edge detection model with high edge-detection accuracy can be generated by using training data including many feature vectors of pixels in the near-edge region R2. Therefore, in one embodiment, the number of pixels in the near-edge region R2 included in the training data is larger than the number of pixels in the non-edge region R3 included in the training data.

The arithmetic system 3 detects an edge on an objective image of the workpiece W using the edge detection model created by the machine learning as follows. The scanning electron microscope 1 generates an objective image of the workpiece W. The arithmetic system 3 receives the objective image of the workpiece W from the scanning electron microscope 1 and calculates a feature vector of a pixel constituting the objective image of the workpiece W. The arithmetic system 3 inputs the feature vector to the edge detection model, and outputs from the edge detection model a determination result indicating whether the pixel having the feature vector is an edge pixel or a non-edge pixel. The arithmetic system 3 then connects a plurality of pixels, each having a feature vector that has obtained a determination result indicating an edge pixel, with a line to generate an edge.

The model generating apparatus 80 including at least one computer operates according to the instructions contained in the programs electrically stored in the memory 80a. Specifically, the model generating apparatus 80 performs the steps of: obtaining a training image of the workpiece W having a pattern formed thereon from the scanning electron microscope 1; detecting an edge of the pattern on the training image; calculating feature vectors of pixels that constitute the training image; dividing a target area in the training image into the edge region R1, the near-edge region R2, and the non-edge region R3; producing training data including feature vectors of pixels in the edge region R1, feature vectors of pixels in the near-edge region R2, and feature vectors of pixels in the non-edge region R3; and producing the edge detection model by the machine learning using the training data.

The program for causing the model generating apparatus 80 to perform these steps is stored in a computer-readable storage medium which is a non-transitory tangible object, and is provided to the model generating apparatus 80 via the storage medium. Alternatively, the program may be input to the model generating apparatus 80 via a communication network, such as the Internet or a local area network.

Next, another embodiment for producing an edge detection model will be described with reference to FIG. 23. Processes of the present embodiment, which will not be particularly described, are the same as those of the above-described embodiments described with reference to FIGS. 17 to 22, and the repetitive descriptions thereof will be omitted.

Figure 23:
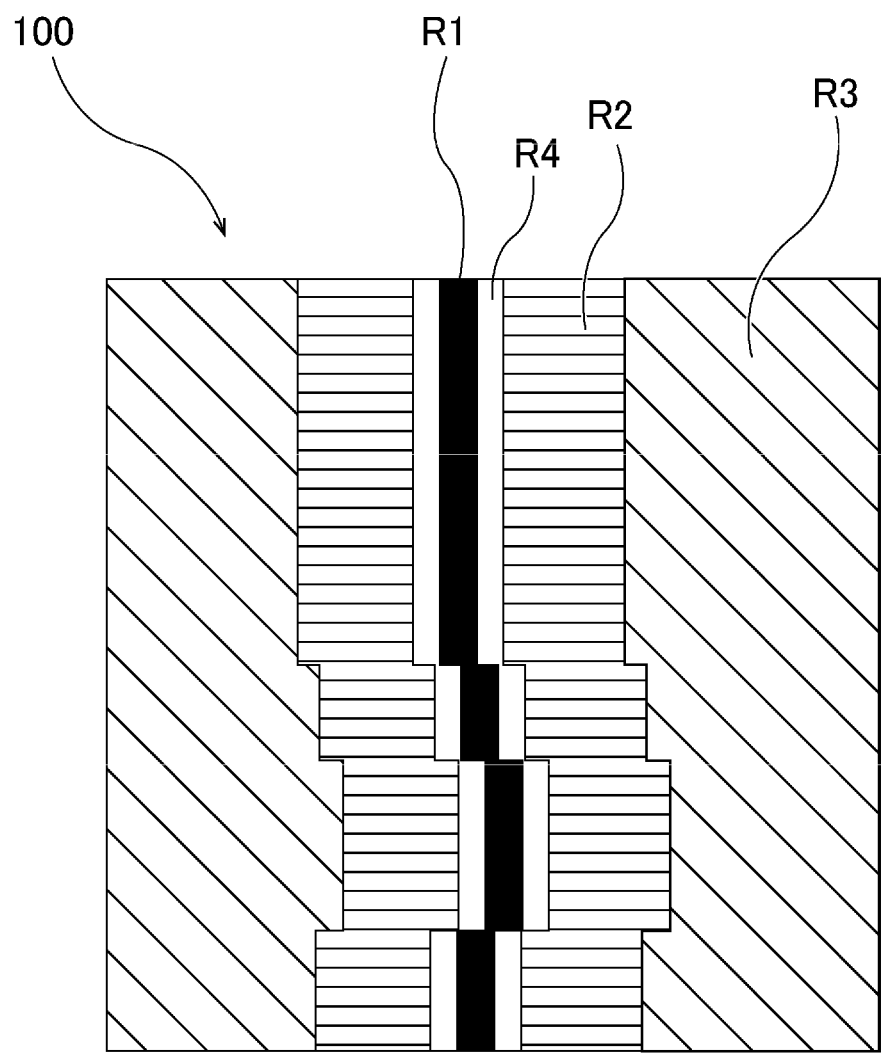
FIG. 23 is a diagram explaining another embodiment of creating an edge detection model.

As shown in FIG. 23, in the present embodiment, the model generating apparatus 80 is configured to divide the target region 100 in the training image into the edge region R1, the near-edge region R2, the non-edge region R3, and an exclusion region R4. The exclusion region R4 is adjacent to the edge region R1 and is located between the edge region R1 and the near-edge region R2. A width of the exclusion region R4 shown in FIG. 23 is constant. In one embodiment, the width of the exclusion region R4 is narrower than the width of the near-edge region R2. Further, in one embodiment, the width of the exclusion region R4 is the same as the width of the edge region R1 or narrower than the width of the edge region R1.

The training data does not include feature vectors of pixels in the exclusion region R4. Specifically, the training data includes feature vectors of pixels in the edge region R1, feature vectors of pixels in the near-edge region R2, and feature vectors of pixels in the non-edge region R3, but does not include feature vectors of pixels in the exclusion region R4. Therefore, the pixels in the exclusion region R4 are not used for the machine learning.

The exclusion region R4 is located next to the edge region R1, and the feature vector of each pixel in the exclusion region R4 is almost the same as the feature vector of each pixel in the edge region R1. Therefore, the pixels in the exclusion region R4 may be edge pixels or non-edge pixels. In other words, the pixels in the exclusion region R4 are uncertain pixels. Including such uncertain pixels in the training data requires the machine learning to continue until the edge detection model satisfies a desired percentage of correct answers. As a result, the machine learning takes a long time to complete. According to this embodiment, since the feature vectors of the pixels in the exclusion region R4 are excluded from the training data, the machine learning of the edge detection model can be completed in a shorter time.

In order to further improve the edge detection accuracy of the edge detection model, in one embodiment, the target region 100 includes a plurality of regions including various pattern edges in the training image. This is because sharpness of edges of patterns on the training image can vary depending on directions in which the edges extend.

Figure 24:
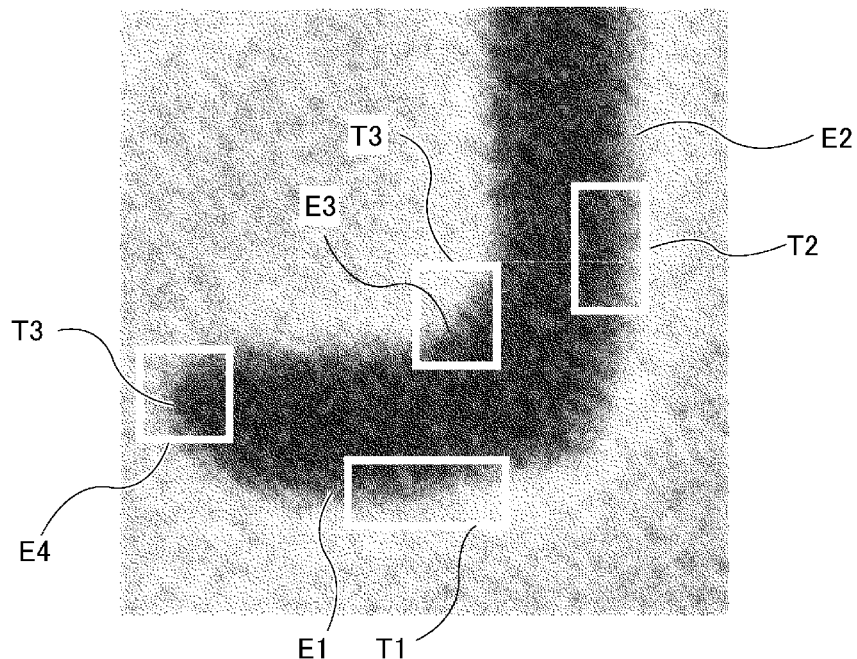
FIG. 24 is a diagram showing an example of a target area including a plurality of areas set in an image.

FIG. 24 is a diagram showing an example of a target region 100 including a plurality of regions set in the training image. As shown in FIG. 24, the target region 100 includes a first region T1 including the first edge E1 of the pattern in the image of the workpiece W, a second region T2 including the second edge E2 perpendicular to the first edge E1, and third regions T3 including the corner edge E3 and the terminal edge E4 of the pattern. The training data includes feature vectors of pixels in the plurality of regions T1, T2, T3 including the edges E1, E2, E3, E4 extending in different directions. The machine learning using such training data can improve the accuracy of detecting edges extending in various directions.

In order to further improve the accuracy of detecting edges extending in multiple directions, in one embodiment, the number of pixels in the first region T1, the number of pixels in the second region T2, and the number of pixels in the third region T3 are in a predetermined ratio. Where the number of pixels in the first region T1 is denoted by S1, the number of pixels in the second region T2 is denoted by S2, and the number of pixels in the third region T3 is denoted by S3, a relationship between S1, S2, and S3 is expressed by the following equation.

$$S1 = m \times S2 = n \times S3$$

where, m is in a range of 0.9 to 1.1 and n is in a range of 0.01 to 0.1.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

INDUSTRIAL APPLICABILITY

The present invention is applicable to a method and an apparatus for detecting an edge (or a contour line) of a pattern, which is formed on a workpiece (e.g., a wafer or a mask) for use in manufacturing of semiconductor, from an image generated by a scanning electron microscope. The present invention is further applicable to a program for causing a computer to perform such pattern-edge detection.

The present invention is further applicable to a method and an apparatus for creating an edge detection model by machine learning.

REFERENCE SIGNS LIST 1 scanning electron microscope
3 arithmetic system
5 database
6 memory
7 processor
10 display screen
12 input device
15 electron gun
16 converging lens
X deflector
18 Y deflector
20 objective lens
21 lens controller
22 deflection controller
25 secondary-electron detector
26 backscattered-electron detector
28 image acquisition device
30 chamber
31 stage
32 stage controller
34 transporting device
50 objective image
51 target pattern
55 virtual edge
60 model
60A, 60B, 60C decision tree
65 search line
67 renewed edge
70 training data
70A. 70B, 70C data group
75 design diagram
80 model generating apparatus
100 target region
W wafer (workpiece)

The invention claimed is:

1. A pattern-edge detection method comprising:
generating an objective image of a target pattern formed on a workpiece;
generating a feature vector representing features of each pixel constituting the objective image;
inputting the feature vector to a model constructed by machine learning;
outputting, from the model, a determination result indicating whether the pixel having the feature vector is an edge pixel or a non-edge pixel; and
connecting a plurality of pixels, each having a feature vector that has obtained a determination result indicating an edge pixel, with a line to generate a virtual edge.

2. The pattern-edge detection method according to claim 1, wherein the model is a decision tree.

3. The pattern-edge detection method according to claim 1, further comprising:
selecting training patterns from design data;
generating training images of real patterns that have been produced based on the training patterns, respectively;
detecting edges of the real patterns on the training images;
classifying reference pixels constituting the training images into first reference pixels each constituting an edge and second reference pixels that do not constitute an edge;
generating first feature vectors of the first reference pixels and second feature vectors of the second reference pixels; and
constructing the model by the machine learning using training data including the first feature vectors and the second feature vectors.

4. The pattern-edge detection method according to claim 3, wherein the training patterns include a plurality of patterns having at least an edge extending in a first direction, an edge extending in a second direction perpendicular to the first direction, a corner edge, and a terminal edge.

5. The pattern-edge detection method according to claim 3, wherein the real patterns are patterns formed on the workpiece.

6. The pattern-edge detection method according to claim 3, wherein selecting the training patterns from the design data comprises:
displaying, on a display screen, a design diagram including a plurality of patterns drawn based on the design data; and
displaying, on the display screen, the training patterns selected from the plurality of patterns included in the design diagram or an area where the training patterns are located in a visually emphasized manner.

7. The pattern-edge detection method according to claim 1, further comprising:
generating multiple brightness profiles of the objective image along multiple search lines each extending in a normal direction with respect to the virtual edge;
determining multiple edge points based on the multiple brightness profiles; and
generating a renewed edge by connecting the multiple edge points with a line.

8. The pattern-edge detection method according to claim 7, further comprising:
generating, from the design data, a CAD pattern corresponding to the target pattern; and
measuring a distance from an edge of the CAD pattern to the renewed edge.

9. The pattern-edge detection method according to claim 1, further comprising:
generating a training image of a workpiece having a pattern formed thereon with a scanning electron microscope;
detecting an edge of the pattern on the training image;
calculating feature vectors of pixels constituting the training image;
dividing a target area in the training image into an edge region, a near-edge region, and a non-edge region;
producing training data including feature vectors of first pixels in the edge region, feature vectors of second pixels in the near-edge region, and feature vectors of third pixels in the non-edge region; and
producing the model by machine learning using the training data.

10. The pattern-edge detection method according to claim 9,
wherein where the number of first pixels is denoted by A, and a sum of the number of second pixels and the number of third pixels is denoted by B, a value (A/B) obtained by dividing the number A by the number B is a predetermined numerical value.

11. The pattern-edge detection method according to claim 10, wherein the value (A/B) obtained by dividing the number A by the number B is in a range of 0.6 to 1.5.

12. The pattern-edge detection method according to claim 9, wherein the non-edge region is located away from the edge region by a predetermined number of pixels, and the near-edge region is located between the edge region and the non-edge region.

13. The pattern-edge detection method according to claim 9, wherein:
dividing the target region in the training image into the edge region, the near-edge region, and the non-edge region comprises dividing the target region in the training image into an edge region, an exclusion region, a near-edge region, and a non-edge region;
the exclusion area is adjacent to the edge region and is located between the edge region and the near-edge region; and
the training data does not include feature vectors of pixels in the exclusion region.

14. The pattern-edge detection method according to claim 9, wherein the target region includes a first region including a first edge, a second region including a second edge perpendicular to the first edge, and a third region including a corner edge and a terminal edge.

15. The pattern-edge detection method according to claim 14, wherein the number of pixels in the first region, the number of pixels in the second region, and the number of pixels in the third region are in a predetermined ratio.

16. A pattern-edge detection apparatus comprising:
an image generating device configured to generate an objective image of a target pattern formed on a workpiece; and
an arithmetic system coupled to the image generating device, the arithmetic system being configured to:
generate a feature vector representing features of each pixel constituting the objective image;
input the feature vector to a model constructed by machine learning;
output, from the model, a determination result indicating whether the pixel having the feature vector is an edge pixel or a non-edge pixel; and
connect a plurality of pixels, each having a feature vector that has obtained a determination result indicating an edge pixel, with a line to generate a virtual edge.

17. The pattern-edge detection apparatus according to claim 16, wherein the model is a decision tree.

18. The pattern-edge detection apparatus according to claim 16, wherein the arithmetic system is configured to:
select training patterns from design data;
generate training images of real patterns that have been produced based on the training patterns, respectively;
detect edges of the real patterns on the training images;
classify reference pixels constituting the training images into first reference pixels each constituting an edge and second reference pixels that do not constitute an edge;
generate first feature vectors of the first reference pixels and second feature vectors of the second reference pixels; and
construct the model by the machine learning using training data including the first feature vectors and the second feature vectors.

19. The pattern-edge detection apparatus according to claim 18, wherein the training patterns include a plurality of patterns having at least an edge extending in a first direction, an edge extending in a second direction perpendicular to the first direction, a corner edge, and a terminal edge.

20. The pattern-edge detection apparatus according to claim 18, wherein the real patterns are patterns formed on the workpiece.

21. The pattern-edge detection apparatus according to claim 18, wherein the arithmetic system includes a display screen, and
the arithmetic system is configured to:
display, on the display screen, a design diagram including a plurality of patterns drawn based on the design data; and
display, on the display screen, the training patterns selected from the plurality of patterns included in the design diagram or an area where the training patterns are located in a visually emphasized manner.

22. The pattern-edge detection apparatus according to claim 16, wherein the arithmetic system is configured to:

generate multiple brightness profiles of the objective image along multiple search lines each extending in a normal direction with respect to the virtual edge;

determine multiple edge points based on the multiple brightness profiles; and generate a renewed edge by connecting the multiple edge points with a line.

23. The pattern-edge detection apparatus according to claim 22, wherein the arithmetic system is configured to:

generate, from the design data, a CAD pattern corresponding to the target pattern; and measure a distance from an edge of the CAD pattern to the renewed edge.

24. The pattern-edge detection apparatus according to claim 16 or 10, further comprising:

a model generating apparatus, the model generating apparatus including:

a memory storing a program for producing the model; and an arithmetic device configured to perform arithmetic operations according to instructions included in the program, wherein the model generating apparatus is configured to:

obtain, from a scanning electron microscope, a training image of a workpiece having a pattern formed thereon;

detect an edge of the pattern on the training image;

calculate feature vectors of pixels constituting the training image;

divide a target area in the training image into an edge region, a near-edge region, and a non-edge region;

produce training data including feature vectors of first pixels in the edge region, feature vectors of second pixels in the near-edge region, and feature vectors of third pixels in the non-edge region; and produce the model by machine learning using the training data.

25. The pattern-edge detection apparatus according to claim 24, wherein where the number of first pixels is denoted by A, and a sum of the number of second pixels and the number of third pixels is denoted by B, a value (A/B) obtained by dividing the number A by the number B is a predetermined numerical value.

26. The pattern-edge detection apparatus according to claim 25, wherein the value (A/B) obtained by dividing the number A by the number B is in a range of 0.6 to 1.5.

27. The pattern-edge detection apparatus according to claim 24, wherein the non-edge region is located away from the edge region by a predetermined number of pixels, and the near-edge region is located between the edge region and the non-edge region.

28. The pattern-edge detection apparatus according to claim 24, wherein:

the model generating apparatus is configured to divide the target region in the training image into an edge region, an exclusion region, a near-edge region, and a non-edge region;

the exclusion area is adjacent to the edge region and is located between the edge region and the near-edge region; and the training data does not include feature vectors of pixels in the exclusion region.

29. The pattern-edge detection apparatus according to claim 24, wherein the target region includes a first region including a first edge, a second region including a second edge perpendicular to the first edge, and a third region including a corner edge and a terminal edge.

30. The pattern-edge detection apparatus according to claim 29, wherein the number of pixels in the first region, the number of pixels in the second region, and the number of pixels in the third region are in a predetermined ratio.

\* \* \* \* \*